(12) United States Patent
Oi et al.

(10) Patent No.: US 8,325,985 B2
(45) Date of Patent: *Dec. 4, 2012

(54) INFORMATION PROCESSING APPARATUS, INFORMATION PROCESSING METHOD, AND COMPUTER PROGRAM

(75) Inventors: Kenichiro Oi, Kanagawa (JP); Steffen Guimann, Tokyo (JP); Takayuki Yoshigahara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/281,518

(22) Filed: Oct. 26, 2011

(65) Prior Publication Data

US 2012/0039511 A1 Feb. 16, 2012

Related U.S. Application Data

(63) Continuation of application No. 12/134,354, filed on Jun. 6, 2008, now Pat. No. 8,073,200.

(30) Foreign Application Priority Data

Jun. 6, 2007 (JP) .............................. P2007-150765

(51) Int. Cl.
*G06K 9/00* (2006.01)
*G06F 17/30* (2006.01)
(52) U.S. Cl. ....................... 382/103; 707/769
(58) Field of Classification Search .................. 382/100, 382/103, 236; 348/152, 154, 155, 169, 170, 348/171, 172; 707/736, 737, 769, 806; 715/259, 715/273, 961
See application file for complete search history.

(56) References Cited

U.S. PATENT DOCUMENTS 5,819,016 A * 10/1998 Watanabe et al. ............. 345/419
7,809,659 B1 * 10/2010 Paiz ................................ 706/20
7,895,201 B2 * 2/2011 Nakamura et al. ............ 707/736
(Continued)

FOREIGN PATENT DOCUMENTS
JP          2003-269937           9/2003
(Continued)

OTHER PUBLICATIONS

Andrew J. Davison, "Real-Time Simultaneous Localisation and Mapping with a Single Camera," Proceedings of the 9th International Conference on Computer Vision, 2003 (8 pages).

(Continued)

*Primary Examiner* — Abolfazl Tabatabai
(74) *Attorney, Agent, or Firm* — Finnegan, Henderson, Farabow, Garrett & Dunner LLP

(57) ABSTRACT

An information processing apparatus that executes processing for creating an environmental map includes a camera that photographs an image, a self-position detecting unit that detects a position and a posture of the camera on the basis of the image, an image-recognition processing unit that detects an object from the image, a data constructing unit that is inputted with information concerning the position and the posture of the camera and information concerning the object and executes processing for creating or updating the environmental map, and a dictionary-data storing unit having stored therein dictionary data in which object information is registered. The image-recognition processing unit executes processing for detecting an object from the image acquired by the camera with reference to the dictionary data. The data constructing unit applies the three-dimensional shape data registered in the dictionary data to the environmental map and executes object arrangement on the environmental map.

27 Claims, 14 Drawing Sheets

U.S. PATENT DOCUMENTS 8,005,841 B1 * 8/2011 Walsh et al. .................. 707/739

FOREIGN PATENT DOCUMENTS

| JP | 2006-190191 A | 7/2006 |
|---|---|---|
| JP | 2006-190192 A | 7/2006 |

OTHER PUBLICATIONS

A. Davison et al., "MonoSLAM: Real-Time Single Camera SLAM," IEEE Transactions on Pattern Analysis and Machine Intelligence, vol. 29, No. 6, pp. 1052-1067 (Jun. 2007).

A. Davison et al., "Real-Time Localisation and Mapping with Wearable Active Vision," Proceedings of the Second IEEE and ACM International Symposium on Mixed and Augmented Reality (ISMAR '03), 10 pages (2003).

European Search Report in related application EP 08 251 674.1 (Feb. 5, 2010).

European Search Report from the European Patent Office for Application No. EP 10 00 3391 (Dated May 19, 2010).

Nagao, "Control Strategies in Pattern Analysis," Pattern Recognition, vol. 17, No. 1, pp. 45-56, (1984).

Tanaka et al., "Global Localization With Detection of Changes in Non-Stationary Environments," Proceedings of the 2004 IEEE International Conference on Robotics & Automation, pp. 1487-1492, (2004).

Huang et al., "Online SLAM in Dynamic Environments," Advanced Robotics, 12$^{th}$ International Conference Proceedings, ICAR '05, pp. 262-267, (2005).

European Search Report from European Patent Office dated Dec. 9, 2008, for Application No. 08251674.1-2218/2000953, 8 pages.

Masahiro Tomono Ed—Anonymous, "3-D Object Map Building Using Dense Object Models with SIFT-based Recognition Features", Intelligent Robots and Systems, 2006 IEEE/RSJ International Conference on IEEE, PI, Oct. 1, 2006, pp. 1885-1890.

Tomono M, "Building an object map for mobile robots using LRF scan matching and vision-based object recognition", Robotics and Automation, 2004. Proceedings. ICRA '04, 2004 IEEE International Conference on Robotics & Automations, New Orleans, LA, Apr. 26-May 1, 2004, Piscataway, NJ, USA, IEEE, Apr. 26, 2004, pp. 3765-3700, vol. 4.

Tanaka K et al., Global localization with detection of changes in non-stationary environments', Robotics and Automation, 2004. Proceedings, ICRA '04. 2004 IEEE International Conference on Robotics & Automation, New Orleans, LA, USA, Apr. 26-May 1, 2004, Piscataway, NJ, USA, IEEE, Apr. 26, 2004, pp. 1487-1492, vol. 2.

Huang G. Q et al., "Online SLAM in dynamic environments", Advanced Robotics, 2005, ICAR '05. Proceedings., 12$^{th}$ International Conference on Seattle, WA, USA Jul. 18-20, 2005, Piscataway, NJ, USA, IEEE, Jul. 18, 2005, pp. 262-267.

Davison A J. et al., "Simultaneous localization and map-building using active vision", IEEE Transactions on Pattern Analysis and Machine Intelligence, IEEE Service Center, Los Alamitos, CA, US, vol. 24, No. 7, Jul. 1, 2002, pp. 865-880.

Provine R. et al., "Ontology-based methods for enhancing autonomous vehicle path planning", Robotics and Autonomous Systems, Elsevier Science Publishers, Amsterdam, NL, vol. 49, No. 1-2, Nov. 30, 2004, pp. 123-133.

* cited by examiner

INFORMATION PROCESSING APPARATUS, INFORMATION PROCESSING METHOD, AND COMPUTER PROGRAM

CROSS-REFERENCES TO RELATED APPLICATIONS

This is a continuation of U.S. application Ser. No. 12/134,354, filed Jun. 6, 2008 now U.S. Pat. No. 8,073,200, which is based upon and claims the benefit of priority under 35 U.S.C. §119 to Japanese Patent Application JP 2007-150765 filed in the Japanese Patent Office on Jun. 6, 2007, the entire contents of both of which are incorporated herein by reference.

BACKGROUND OF THE INVENTION

1. Field of the Invention

The present invention relates to an information processing apparatus, an information processing method, and a computer program, and, more particularly to an information processing apparatus, an information processing method, and a computer program for executing creation of a map (an environmental map) (mapping) around a camera, i.e., environmental map creation processing on the basis of an image photographed by the camera.

The present invention relates to an information processing apparatus, an information processing method, and a computer program for observing a moving environment in an agent (a moving object) such as a robot including a camera, executing creation of a map (an environmental map) (mapping) around the agent, i.e., environmental map creation processing according to an observation state, and further executing estimation of a position and a posture of the agent, i.e., identification processing (localization) for an own position or an own posture in conjunction with the environmental map creation processing.

2. Description of the Related Art

Environmental map construction processing for observing a moving environment in an agent (a moving object) such as a robot including a camera and creating a map (an environment map) around the agent according to an observation state is often performed for route search for moving objects such as a car and a robot. JP-A-2003-269937 discloses a technique for detecting planes from a distance image (a stereo image) created from images photographed by plural cameras, finding a floor surface from the detected group of planes and positions and postures of the imaging devices, and finally recognizing an obstacle from the floor surface. However, in an analysis of a peripheral environment executed by the technique disclosed in JP-A-2003-269937, the environment can only be distinguished as the "floor" and the "obstacle".

In the method described above, it is necessary to generate a distance image using photographed images of the plural cameras. Techniques for creating an environmental map on the basis of image analysis processing for one camera-photographed image without creating such a distance image are also being actively developed. Most of the techniques are systems for recognizing various kinds of information from only one image acquired by a monocular camera. However, most of these kinds of processing are adapted to calculate, for example, with a coordinate system having an origin in a position of a camera set as a world coordinate system, positions of objects around the world coordinate system. In other words, it is a main object of the processing to allow a robot including a camera to run without colliding with objects around the robot. A detailed analysis for various recognition targets included in an image photographed by a camera, for example, recognition result objects such as "wall", "table", and "sofa", specifically, for example, an analysis of three-dimensional shapes of the respective recognition targets is not performed. Therefore, the techniques only create an environmental map for self-sustained traveling.

SUMMARY OF THE INVENTION

Therefore, it is desirable to provide an information processing apparatus, an information processing method, and a computer program for creating an environmental map based on an image photographed by a camera and executing an analysis of various objects included in the photographed image to create an environmental map including more detailed information.

According to an embodiment of the present invention, there is provided an information processing apparatus that executes processing for creating an environmental map. The information processing apparatus includes a camera that photographs an image, a self-position detecting unit that detects a position and a posture of the camera on the basis of the image acquired by the camera, an image-recognition processing unit that detects an object from the image acquired by the camera, a data constructing unit that is inputted with information concerning the position and the posture of the camera detected by the self-position detecting unit and information concerning the object detected by the image-recognition processing unit and executes processing for creating or updating the environmental map, and a dictionary-data storing unit having stored therein dictionary data in which object information including at least three-dimensional shape data corresponding to objects is registered. The image-recognition processing unit executes processing for detecting an object from the image acquired by the camera with reference to the dictionary data. The data constructing unit applies the three-dimensional shape data registered in the dictionary data to the environmental map and executes object arrangement on the environmental map.

Preferably, the image-recognition processing unit identifies a position of a feature point of the object included in the image acquired by the camera and executes processing for outputting the position of the feature point to the data constructing unit. The data constructing unit executes processing for calculating a position and a posture in a world coordinate system of the object on the basis of information concerning the feature point inputted from the image-recognition processing unit and information concerning the position and the posture of the camera inputted from the self-position detecting unit and registering the position and the posture in the world coordinate system of the object in the environmental map.

Preferably, the self-position detecting unit executes processing for calculating a camera position (Cw) and a camera rotation matrix (Rw) as estimated position and posture information of the camera, which are represented by a world coordinate system by using a feature point in the image inputted from the camera, and outputting the camera position (Cw) and the camera rotation matrix (Rw) to the data constructing unit.

Preferably, the self-position detecting unit executes SLAM (simultaneous localization and mapping) for simultaneously detecting a position of a feature point in the image inputted from the camera and a position and a posture of the camera.

Preferably, the information processing apparatus further includes a coordinate converting unit that converts a position of a feature point in an object in an image frame before an object detection target frame in the image-recognition processing unit into a position on a coordinate corresponding to an image of the object detection target frame in the image-recognition processing unit. The image-recognition processing unit executes processing for outputting feature point information provided by the coordinate converting unit to the data constructing unit.

Preferably, the information processing apparatus further includes a feature-point collating unit that records, when a feature point detected by the image-recognition processing unit and a feature point detected by the self-position detecting unit are at a distance within a threshold set in advance, the feature points in a feature point database. The coordinate converting unit performs processing for converting positions of the feature points recorded in the feature point database into positions on the coordinate corresponding to the image of the object detection target frame in the image-recognition processing unit and making the positions of the feature points usable in the image-recognition processing unit.

Preferably, the data constructing unit includes an environmental map database in which a generated environmental map is stored, an environmental-information acquiring unit that acquires the environmental map from the environmental map database, a recognition-result comparing unit that compares the environmental map acquired by the environmental-information acquiring unit and object detection information inputted from the image-recognition processing unit and outputs a result of the comparison to an environmental-map updating unit, and the environmental-map updating unit that executes, on the basis of the result of the comparison inputted from the recognition-result comparing unit, processing for updating the environmental map stored in the environmental map database.

Preferably, the environmental-information acquiring unit includes a feature-point-information generating unit that acquires the environmental map from the environmental map database and generates feature point information including a position of a feature point included in the acquired environmental map. The recognition-result comparing unit includes a feature-point-information comparing unit that compares feature point information corresponding to an object inputted from the image-recognition processing unit and the feature point information generated by the feature-point-information generating unit and outputs comparison information to an intra-image-change-area extracting unit in the environmental-map updating unit. The environmental-map updating unit includes the intra-image-change-area extracting unit that is inputted with the comparison information from the feature-point-information comparing unit and extracts, as an update area of the environmental map, an area other than an area where a distance between matched feature points is smaller than a threshold set in advance and an environmental-map updating unit that executes update processing on the environmental map stored in the environmental map database using the feature point information inputted from the image-recognition processing unit with only the update area extracted by the intra-image-change-area extracting unit set as an update target.

Preferably, the environmental-information acquiring unit includes a presence-probability-distribution extracting unit that acquires the environmental map from the environmental map database and extracts a presence probability distribution of centers of gravity and postures of objects included in the acquired environmental map. The recognition-result comparing unit includes a presence-probability-distribution generating unit that is inputted with an object recognition result from the image-recognition processing unit and generates a presence probability distribution of the recognized object and a probability-distribution comparing unit that compares a presence probability distribution of the recognized object generated by the presence-probability-distribution generating unit on the basis of the environmental map and a presence probability distribution of the object generated by the presence-probability-distribution generating unit on the basis of the recognition result of the image-recognition processing unit and outputs comparison information to the environmental-map updating unit. The environmental-map updating unit determines an update area of the environmental map on the basis of the comparison information inputted from the presence-probability-distribution comparing unit and executes update processing on the environmental map stored in the environmental map database using feature point information inputted from the image-recognition processing unit with only the update area set as an update target.

Preferably, the probability-distribution comparing unit calculates a Mahalanobis distance "s" indicating a difference between the presence probability distribution of the recognized object generated by the presence-probability-distribution extracting unit on the basis of the environmental map and the presence probability distribution of the object generated by the presence-probability-distribution generating unit on the basis of the recognition result of the image-recognition processing unit and outputs the Mahalanobis distance "s" to the environmental-map updating unit. The environmental-map updating unit executes, when the Mahalanobis distance "s" is larger than a threshold set in advance, processing for updating the environmental map registered in the environmental map database.

According to another embodiment of the present invention, there is provided an information processing apparatus that executes processing for specifying an object search range on the basis of an environmental map. The information processing apparatus includes a storing unit having stored therein ontology data (semantic information) indicating likelihood of presence of a specific object in an area adjacent to an object and an image-recognition processing unit that determines a search area of the specific object on the basis of the ontology data (the semantic information).

According to still another embodiment of the present invention, there is provided an information processing method for executing processing for creating an environmental map. The information processing method includes an image photographing step in which a camera photographs an image, a self-position detecting step in which a self-position detecting unit detects a position and a posture of the camera on the basis of the image acquired by the camera, an image-recognition processing step in which an image-recognition processing unit detects an object from the image acquired by the camera, and a data constructing step in which a data constructing unit is inputted with information concerning the position and the posture of the camera detected by the self-position detecting unit and information concerning the object detected by the image-recognition processing unit and executes processing for creating or updating the environmental map. In the image-recognition processing step, the image-recognition processing unit executes processing for detecting an object from the image acquired by the camera with reference to dictionary data in which object information including at least three-dimensional shape data corresponding to objects is registered. In the data constructing step, the data constructing unit applies the three-dimensional shape data registered in the dictionary data to the environmental map and executes object arrangement on the environmental map.

Preferably, the image-recognition processing step is a step of identifying a position of a feature point of the object included in the image acquired by the camera and executing processing for outputting the position of the feature point to the data constructing unit. The data constructing step is a step of executing processing for calculating a position and a posture in a world coordinate system of the object on the basis of information concerning the feature point inputted from the image-recognition processing unit and information concerning the position and the posture of the camera inputted from the self-position detecting unit and registering the position and the posture in the world coordinate system of the object in the environmental map.

Preferably, the self-position detecting step is a step of executing processing for calculating a camera position (Cw) and a camera rotation matrix (Rw) as estimated position and posture information of the camera, which are represented by a world coordinate system by using a feature point in the image inputted from the camera, and outputting the camera position (Cw) and the camera rotation matrix (Rw) to the data constructing unit.

Preferably, the self-position detecting step is a step of executing SLAM (simultaneous localization and mapping) for simultaneously detecting a position of a feature point in the image inputted from the camera and a position and a posture of the camera.

Preferably, the information processing method further includes a coordinate converting step in which a coordinate converting unit converts a position of a feature point in an object in an image frame before an object detection target frame in the image-recognition processing unit into a position on a coordinate corresponding to an image of the object detection target frame in the image-recognition processing unit. The image-recognition processing step is a step of executing processing for outputting feature point information provided by the coordinate converting unit to the data constructing unit.

Preferably, the information processing method further includes a feature-point collating step in which a feature-point collating unit records, when a feature point detected by the image-recognition processing unit and a feature point detected by the self-position detecting unit are at a distance within a threshold set in advance, the feature points in a feature point database. The coordinate converting step is a step of performing processing for converting positions of the feature points recorded in the feature point database into positions on the coordinate corresponding to the image of the object detection target frame in the image-recognition processing unit and making the positions of the feature points usable in the image-recognition processing unit.

Preferably, the data constructing step includes an environmental-information acquiring step in which an environmental-information acquiring unit acquires the generated environmental map from the environmental map database, a recognition-result comparing step in which recognition-result comparing unit compares the environmental map acquired from the environmental map database and object detection information inputted from the image-recognition processing unit and outputs a result of the comparison to an environmental-map updating unit, and an environmental-map updating step in which the environmental-map updating unit executes, on the basis of the result of the comparison inputted from the recognition-result comparing unit, processing for updating the environmental map stored in the environmental map database.

Preferably, the environmental-information acquiring step includes a feature-point-information generating step in which a feature-point-information generating unit acquires the environmental map from the environmental map database and generates feature point information including a position of a feature point included in the acquired environmental map. The recognition-result comparing step includes a feature-point-information comparing step in which the feature-point-information comparing unit compares feature point information corresponding to an object inputted from the image-recognition processing unit and the feature point information generated by the feature-point-information generating unit and outputs comparison information to an intra-image-change-area extracting unit in the environmental-map updating unit. The environmental-map updating step includes an intra-image change-area extracting step in which the intra-image-change-area extracting unit is inputted with the comparison information from the feature-point-information comparing unit and extracts, as an update area of the environmental map, an area other than an area where a distance between matched feature points is smaller than a threshold set in advance and an environmental-map updating step in which an environmental-map updating unit executes update processing on the environmental map stored in the environmental map database using the feature point information inputted from the image-recognition processing unit with only the update area extracted by the intra-image-change-area extracting unit set as an update target.

Preferably, the environmental-information acquiring step includes a presence-probability-distribution extracting step in which a presence-probability-distribution extracting unit acquires the environmental map from the environmental map database and extracts a presence probability distribution of centers of gravity and postures of objects included in the acquired environmental map. The recognition-result comparing step includes a presence-probability-distribution generating step in which a presence-probability-distribution generating unit is inputted with an object recognition result from the image-recognition processing unit and generates a presence probability distribution of the recognized object and a probability-distribution comparing step in which a probability-distribution comparing unit that compares a presence probability distribution of the recognized object generated by the presence-probability-distribution generating unit on the basis of the environmental map and a presence probability distribution of the object generated by the presence-probability-distribution generating unit on the basis of the recognition result of the image-recognition processing unit and outputs comparison information to the environmental-map updating unit. The environmental-map updating step is a step of determining an update area of the environmental map on the basis of the comparison information inputted from the presence-probability-distribution comparing unit and executing update processing on the environmental map stored in the environmental map database using feature point information inputted from the image-recognition processing unit with only the update area set as an update target.

Preferably, the probability-distribution comparing step is a step of calculating a Mahalanobis distance "s" indicating a difference between the presence probability distribution of the recognized object generated by the presence-probability-distribution extracting unit on the basis of the environmental map and the presence probability distribution of the object generated by the presence-probability-distribution generating unit on the basis of the recognition result of the image-recognition processing unit and outputting the Mahalanobis distance "s" to the environmental-map updating unit. The environmental-map updating step is a step of executing, when the Mahalanobis distance "s" is larger than a threshold set in advance, processing for updating the environmental map registered in the environmental map database.

According to still another embodiment of the present invention, there is provided a computer program for causing an information processing apparatus to execute processing for creating an environmental map. The computer program includes an image photographing step of causing a camera to photograph an image, a self-position detecting step of causing a self-position detecting unit to detect a position and a posture of the camera on the basis of the image acquired by the camera, an image-recognition processing step of causing an image-recognition processing unit to detect an object from the image acquired by the camera, and a data constructing step of inputting information concerning the position and the posture of the camera detected by the self-position detecting unit and information concerning the object detected by the image-recognition processing unit to a data constructing unit and causing the data constructing unit to execute processing for creating or updating the environmental map. The image-recognition processing step is a step of detecting an object from the image acquired by the camera with reference to dictionary data in which object information including at least three-dimensional shape data corresponding to objects is registered. The data constructing step is a step of applying the three-dimensional shape data registered in the dictionary data to the environmental map and executing object arrangement on the environmental map.

The computer program according to the embodiment of the present invention is, for example, a computer program that can be provided to a general-purpose computer system, which can execute various program codes, by a storage medium and a communication medium provided in a computer readable format. By providing the program in a computer readable format, processing in accordance with the program is realized on a computer system.

Other objects, characteristics, and advantages of the present invention will be made apparent by more detailed explanation based on embodiments of the present invention described later and attached drawings. In this specification, a system is a logical set of plural apparatuses and is not limited to a system in which apparatuses having different structures are provided in an identical housing.

According to an embodiment of the present invention, the information processing apparatus executes self-position detection processing for detecting a position and a posture of a camera on the basis of an image acquired by the camera, image recognition processing for detecting an object from the image acquired by the camera, and processing for creating or updating an environmental map by applying position and posture information of the camera, object information, and a dictionary data in which object information including at least three three-dimensional shape data corresponding to the object is registered. Therefore, it is possible to efficiently create an environmental map, which reflects three-dimensional data of various objects, on the basis of images acquired by one camera.

DESCRIPTION OF THE PREFERRED EMBODIMENTS

Embodiments of the present invention will be herein after explained with reference to the accompanying drawings.

First Embodiment

Figure 1:
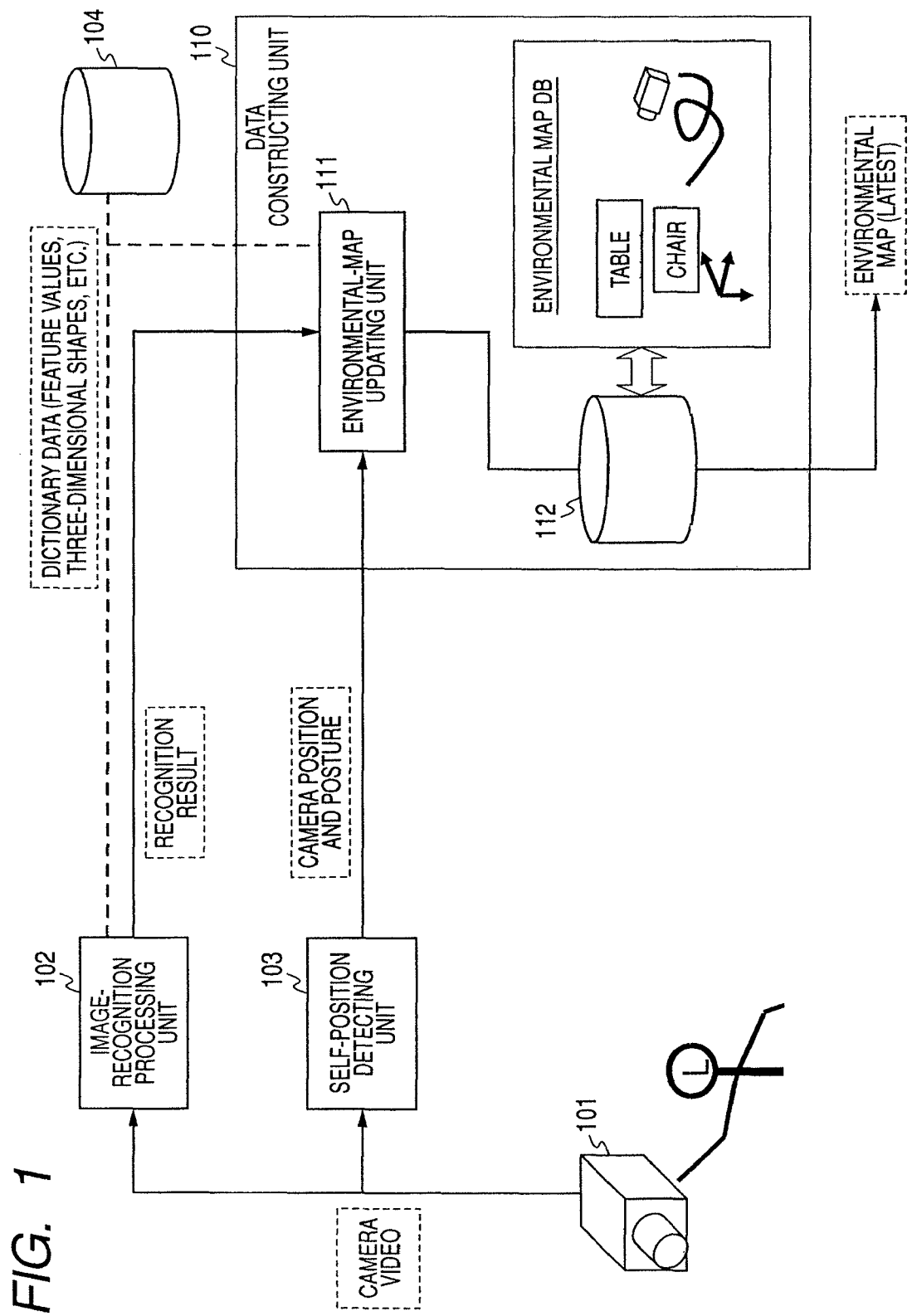
FIG. 1 is a diagram for explaining the structure and processing of an information processing apparatus according to a first embodiment of the present invention.

The structure of an information processing apparatus according to a first embodiment of the present invention is explained with reference to FIG. 1. The information processing apparatus according to this embodiment is an information processing apparatus that constructs an environmental map on the basis of image data photographed by a camera. As shown in FIG. 1, the information processing apparatus includes a camera 101 that photographs a peripheral environment, an image-recognition processing unit 102 that is inputted with a photographed image of the camera 101 and performs image recognition, a self-position detecting unit 103 that is inputted with the photographed image of the camera 101 and estimates a position and a posture of the camera 101, a data constructing unit 110 that is inputted with image recognition result data generated by the image-recognition processing unit 102 and information concerning the position and the posture of the camera 101 detected by the self-position detecting unit 103 and executes processing for creating an environmental map represented by a certain world coordinate system, and a dictionary-data storing unit 104 having stored therein dictionary data used for image recognition processing in the image-recognition processing unit 102 and environmental map creation processing in the data constructing unit 110.

A camera video is used as at least an input to the image-recognition processing unit 102 and the self-position detecting unit 103. The image-recognition processing unit 102 outputs recognition result including position and posture information in images of various objects (detection targets) photographed by the camera 101 to the data constructing unit 110. However, a recognition result is represented by a camera coordinate system. The self-position detecting unit 103 outputs the position and posture information of the camera 101 to the data constructing unit 110. The data constructing unit 110 calculates positions and postures of various objects in a world coordinate system (a coordinate system of the environmental map) on the basis of the recognition result inputted from the image-recognition processing unit 102 and the camera position and posture information inputted from the self-position detecting unit 103, updates the environmental map, and outputs a latest environmental map.

The data constructing unit 110 has an environmental map updating unit 111 that is inputted with the recognition result from the image-recognition processing unit 102 and the camera position and posture information from the self-position detecting unit 103, calculates positions and postures of various objects in the world coordinate system (the coordinate system of the environment map), and updates the environmental map and an environmental map database 112 that stores the updated environmental map. The environmental map created by the data constructing unit 110 is data including detailed information concerning various objects included in an image photographed by the camera 101, for example, various objects such as a "table" and a "chair", specifically, detailed information such as a three-dimensional shape and position and posture information.

The image-recognition processing unit 102 is inputted with a photographed image of the camera 101, executes image recognition, creates a recognition result including position and posture information in images of various objects (detection targets) photographed by the camera 101, and outputs the recognition result to the data constructing unit 110. As image recognition processing executed by the image-recognition processing unit 102, image recognition processing based on image recognition processing disclosed in, for example, JP-A-2006-190191 and JP-A-2006-190192 is executed. A specific example of the processing is described later.

The self-position detecting unit 103 is developed on the basis of the technique described in the document "Andrew J. Davison, "Real-time simultaneous localization and mapping with a single camera", Proceedings of the 9$^{th}$ International Conference on Computer Vision, Ninth, (2003)". The self-position detecting unit 103 performs processing for simultaneously estimating positions of feature points in a three-dimensional space and a camera position frame by frame on the basis of a change among frames of a position of local areas (hereinafter referred to as feature points) in an image photographed by the camera 101. Only a video of the camera 101 is set as an input to the self-position detecting unit 103 according to this embodiment. However, other sensors may be used to improve robustness of self-position estimation.

Stored data of the dictionary-data storing unit 104 having dictionary data stored therein used for the image recognition processing in the image-recognition processing unit 102 and the environmental map creation processing in the data constructing unit 110 is explained with reference to FIG. 2.

In the dictionary data, information concerning objects (recognition targets) predicted to be photographed by the camera 101 is collectively stored for each of the objects. For one object (recognition target), the following information is stored:

(1) object name;
(2) feature point information (two-dimensional information from a main viewpoint. See FIG. 2 for details);
(3) physical shape information (including position information of a feature point); and
(4) ontology information (including information such as a category to which the object belongs, an object that the object is highly likely to come into contact with, and a moving object and a still object).

Figure 2:
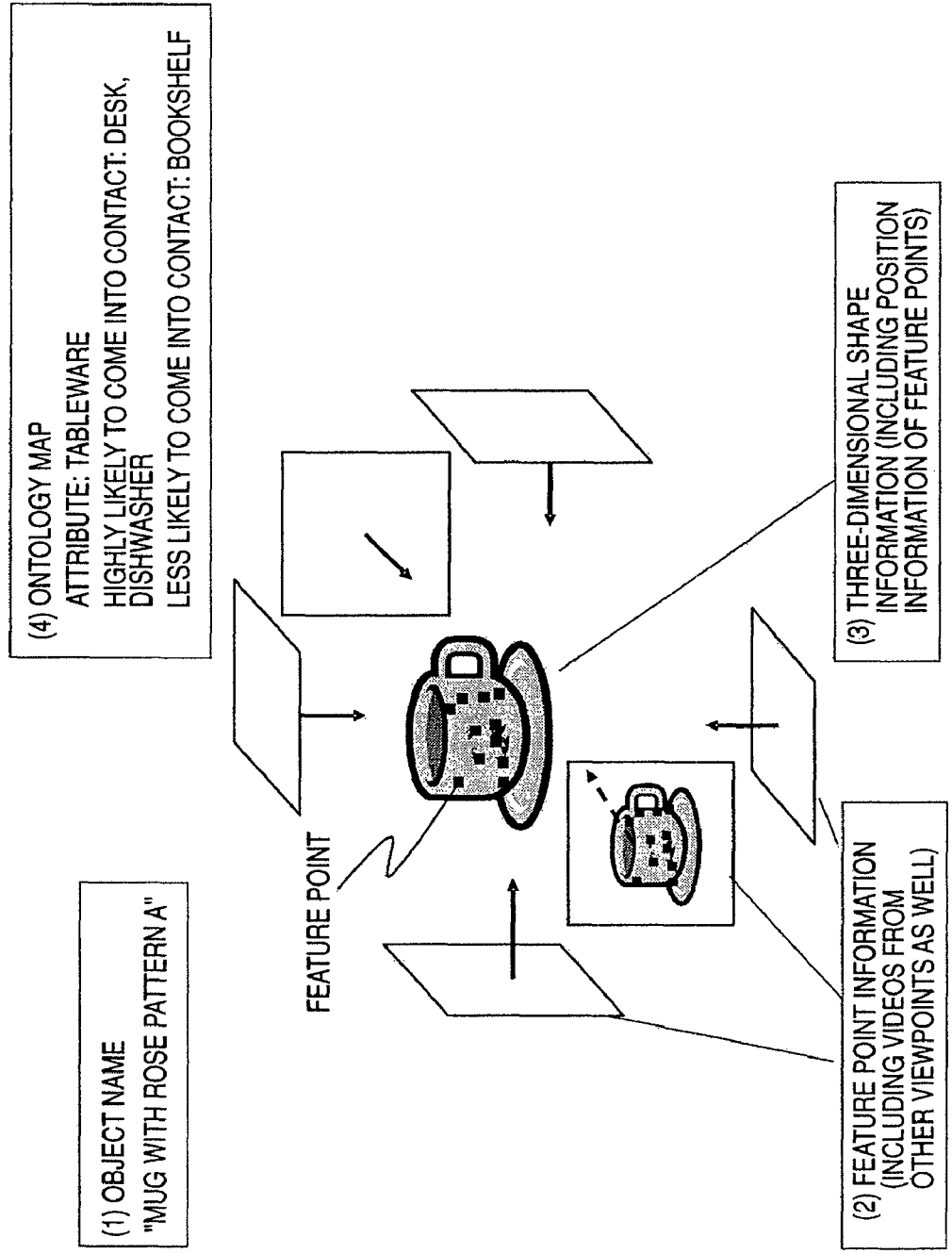
FIG. 2 is a diagram for explaining dictionary data, which is data stored in a dictionary-data storing unit.

FIG. 2 shows an example of registered information of dictionary data concerning a cup.

The following information is recorded in the dictionary data:
(1) object name: "a mug with a rose pattern";
(2) feature point information: feature point information of the object observed from viewpoints in six directions; up and down, front and rear, and left and right direction is recorded; feature point information may be image information from the respective viewpoints;
(3) physical shape information: three-dimensional shape information of the object is recorded; positions of the feature points are also recorded; and
(4) ontology information;
(4-1) attribute of the object: "tableware";
(4-2) information concerning an object highly likely to come into contact with the object: "desk" "dish washer"; and
(4-3) information concerning an object less likely to come into contact with the object: "bookshelf".

The information described above corresponding to various objects is recorded in the dictionary-data storing unit 104.

A specific example of environmental map creation processing executed in the information processing apparatus according to this embodiment explained with reference to FIG. 1 is explained.

An example of processing for constructing an environmental map using images photographed by the camera 101 of the information processing apparatus shown in FIG. 1 is explained. As the camera 101, a camera matching the pinhole camera model is used. The pinhole camera model represents projection conversion for positions of points in the three-dimensional space and pixel positions on a plane of a camera image and is represented by the following equation:

$$\lambda \tilde{m} = AR_w(M - C_w)$$ (Equation 1)

Figure 3:
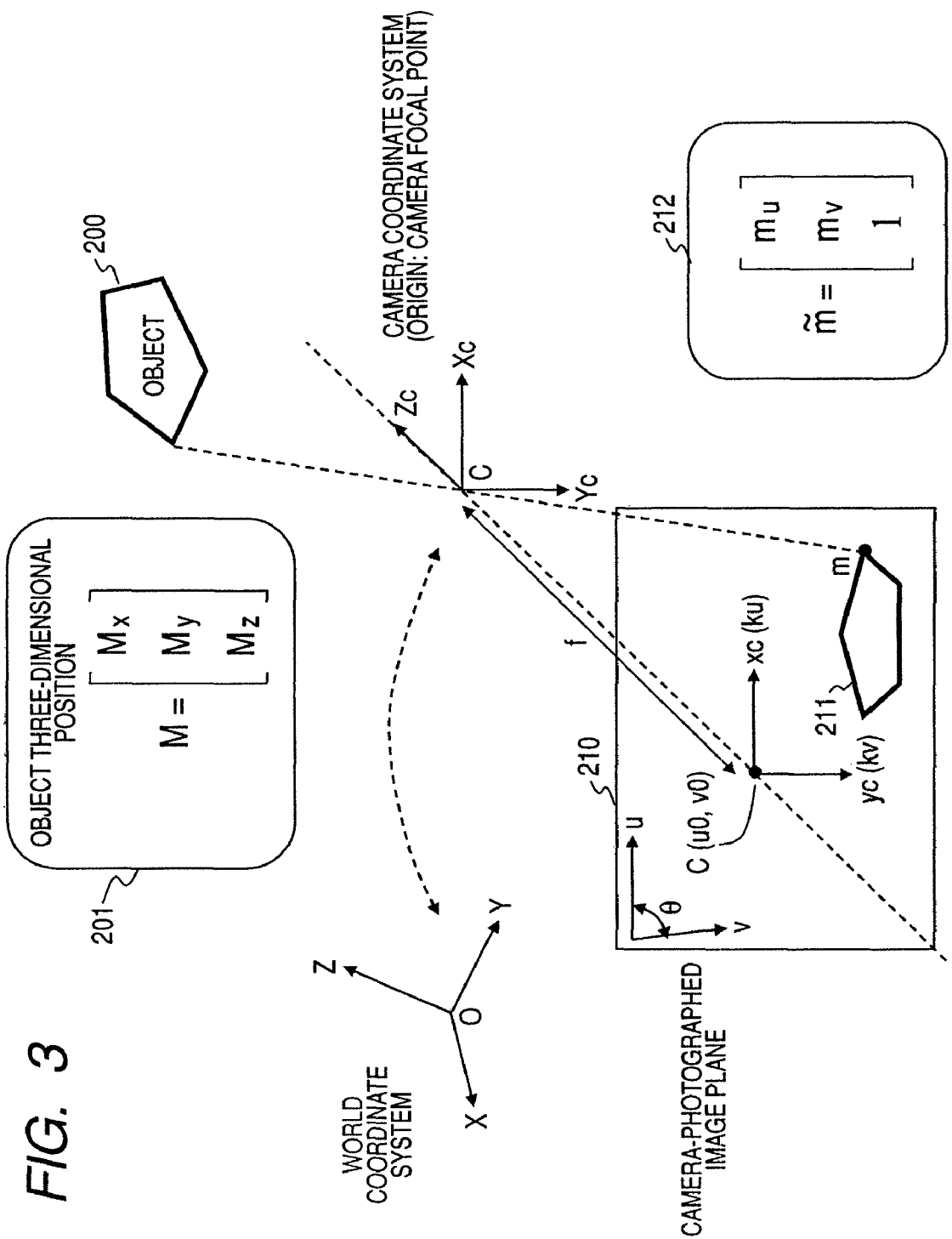
FIG. 3 is a diagram for explaining meaning of an equation indicating a correspondence relation between a position represented by a pinhole camera model, i.e., a camera coordinate system and a three-dimensional position of an object in a world coordinate system.

Meaning of the equation is explained with reference to FIGS. 3 and 4. The equation is an equation indicating a correspondence relation between a pixel position 212 on a plane of a camera image at a point (m) of an object 211 included in a photographed image 210 of the camera 101, i.e., a position represented by the camera coordinate system and a three-dimensional position (M) 201 of an object 200 in the world coordinate system.

The pixel position 212 on the plane of the camera image is represented by the camera coordinate system. The camera coordinate system is a coordinate system in which, with a focal point of the camera set as an origin C, an image plane is a two-dimensional plane of Xc and Yc, and depth is Zc. The origin C moves according to the movement of the camera 101.

On the other hand, the three-dimensional position (M) 201 of the object 200 is indicated by the world coordinate system having an origin 0 that does not move according to the movement of the camera and including three axes X, Y, and Z. An equation indicating a correspondence relation among positions of objects in these different coordinate systems is defined as the pinhole camera model.

Figure 4:
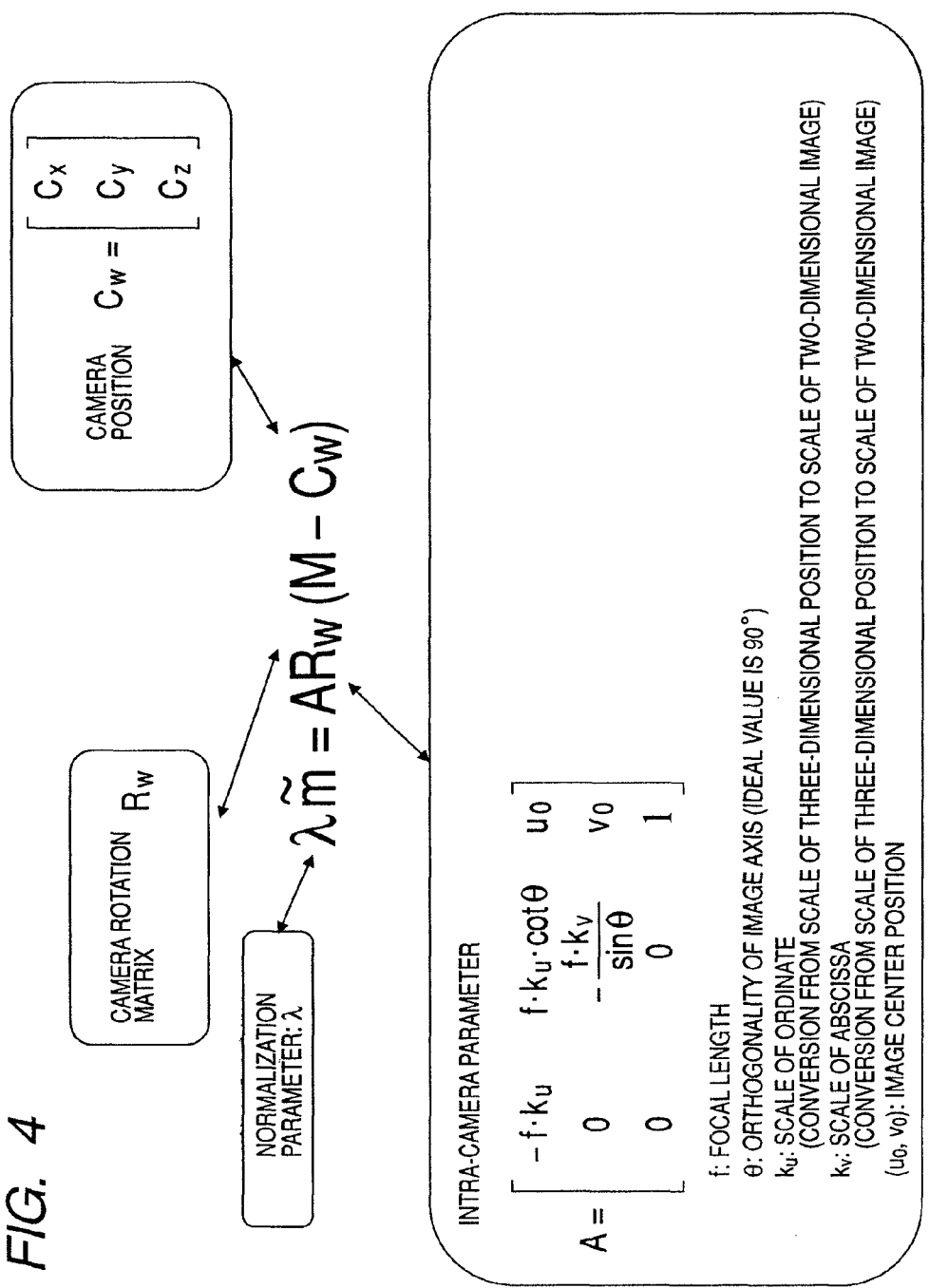
FIG. 4 is a diagram for explaining the meaning of the equation indicating a correspondence relation between a position represented by a pinhole camera model, i.e., a camera coordinate system and a three-dimensional position of an object in a world coordinate system.

As shown in FIG. 4, elements included in the equation have meaning as described below:

λ: normalization parameter;
A: intra-camera parameter;
Cw: camera position; and
Rw: camera rotation matrix.

The intra-camera parameter A includes the following values:

f: focal length;
θ: orthogonality of an image axis (an ideal value is 90°);
ku: scale of an ordinate (conversion from a scale of a three-dimensional position into a scale of a two-dimensional image);
kv: scale on an abscissa (conversion from a scale of three-dimensional position into a scale of a two-dimensional image); and
(u0, v0): image center position.

The data constructing unit 110 shown in FIG. 1 creates, using the pinhole camera model, i.e., the equation representing projection conversion for positions of points in the three-dimensional space and pixel positions on a plane of a camera image, an environmental map in which information in the camera coordinate system obtained from a photographed image of the camera 101 is converted into information in the world coordinate system. For example, an example of processing performed when a user (a physical agent) holds the camera 101, freely moves the camera 101 to photograph a moving image, and inputs the photographed image to the image-recognition processing unit 102 and the self-position detecting unit 103 is explained.

The self-position detecting unit 103 corrects, using feature points in a video inputted from the camera 101, positions of the feature points and a camera position frame by frame and outputs a position (Cw) of the camera 101 and a rotation matrix (Rw) of the camera 101 as estimated position and posture information of the camera 101 represented by the world coordinate system determined by the self-position detecting unit 103 to the data constructing unit 110. For this processing, it is possible to use a method described in the thesis "Andrew J. Davison, "Real-time simultaneous localization and mapping with a single camera", Proceedings of the 9$^{th}$ International Conference on Computer Vision, Ninth, (2003)".

The photographed image of the camera 101 is sent to the image-recognition processing unit 102 as well. The image-recognition processing unit 102 performs image recognition using parameters (feature values) that describe features of the feature points. A recognition result obtained by the image-recognition processing unit 102 is an attribute (a cop A, a chair B, etc.) of an object and a position and a posture of a recognition target in an image. Since a result obtained by the image recognition is not represented by the world coordinate system, it is difficult to directly combine the result with recognition results in the past.

Therefore, the data constructing unit 110 acquires, from the dictionary-data storing unit 104, the pinhole camera model, i.e., the equation representing projection conversion for positions of points in the three-dimensional space and pixel positions on a plane of a camera image and the dictionary data including shape data of an object acquired as prior information and projection-converts the equation and the dictionary data into the three-dimensional space.

From Equation 1 described above, the following Equation 2, i.e., an equation indicating a three-dimensional position (M) in the world coordinate system of a point where an object included in the photographed image of the camera 101 is present, i.e., a feature point (m) is derived.

$$M = C_w + \lambda \cdot R_w^T A^{-1} \tilde{m} = C_w + d \cdot R_w^T \frac{A^{-1}\tilde{m}}{\|A^{-1}\tilde{m}\|} \quad \text{(Equation 2)}$$

In the above equation, "d" represents a distance in a real world between the camera 101 and the feature point of the object. When the distance (d) is calculated, it is possible to calculate a position of an object in the camera coordinate system. As described above, λ of Equation 1 is the normalization parameter. However, λ is a normalization variable not related to a distance (depth) between the camera 101 and the object and changes according to input data regardless of a change in the distance (d).

Figure 5:
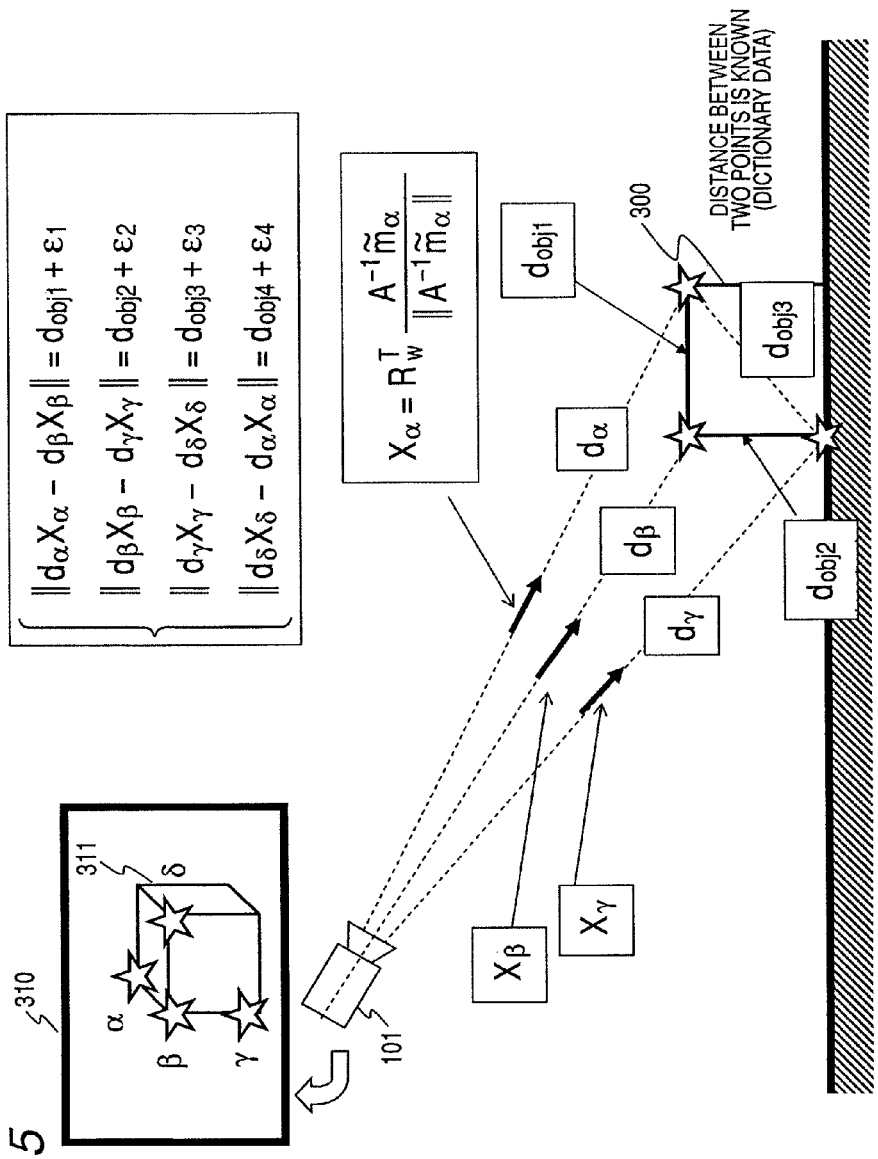
FIG. 5 is a diagram for explaining processing for calculating distances from a camera to feature points of an object.

Processing for calculating a distance from the camera 101 to the feature point of the object is explained with reference to FIG. 5. FIG. 5 shows an image 310 obtained by photographing an object 300 with the camera 101. An object image 311, which is an image of the object 300, is included in the photographed image 310.

The image-recognition processing unit 102 obtains four feature points α, β, γ, and δ from the object image 311 in the photographed image 301 as shown in the figure. The image-recognition processing unit 102 extracts the dictionary data from the dictionary-data storing unit 104, executes collation of the object image 311 and the dictionary data, specifies the photographed object image 311, and determines feature point positions in the object image 311 corresponding to feature point information registered as dictionary data in association with the specified object. As shown in the figure, the feature point positions are four vertexes α, β, γ, and δ of a rectangular parallelepiped.

The data constructing unit 110 acquires information concerning the feature points α, β, γ, and δ from the image-recognition processing unit 102, acquires the pinhole camera model, i.e., the equation representing projection conversion for positions of points in the three-dimensional space and pixel positions on a plane of a camera image and the dictionary data including shape data of an object acquired as prior information, and projection-converts the equation and the dictionary data into the three-dimensional space. Specifically, the data constructing unit 110 calculates distances (depths) from the camera 101 to the respective feature points α, β, γ, and δ.

In the dictionary data, the three-dimensional shape information of the respective objects is registered as described before. The image-recognition processing unit 102 applies Equation 3 shown below on the basis of the three-dimensional shape information and calculates distances (depths) from the camera 101 to the respective feature points α, β, γ, and δ.

$$\begin{cases} \|d_\alpha X_\alpha - d_\beta X_\beta\| = d_{obj1} + \varepsilon_1 \\ \|d_\beta X_\beta - d_\gamma X_\gamma\| = d_{obj2} + \varepsilon_2 \\ \|d_\gamma X_\gamma - d_\delta X_\delta\| = d_{obj3} + \varepsilon_3 \\ \|d_\delta X_\delta - d_\alpha X_\alpha\| = d_{obj4} + \varepsilon_4 \end{cases} \quad \text{(Equation 3)}$$

In Equation 3, dα represents a distance from the camera 101 to the feature point a of the object 300, dβ represents a distance from the camera 101 to the feature point β of the object 300, dγ represents a distance from the camera 101 to the feature point γ of the object 300, dδ represents a distance from the camera 101 to the feature point δ of the object 300, dobj1 represents a distance between the feature points α and β of the object 300 (registered information of the dictionary data), dobj2 represents a distance between the feature points β and γ of the object 300 (registered information of the dictionary data), and dobj3 represents a distance between the feature points γ and δ of the object 300 (registered information of the dictionary data).

xα represents a vector from the camera 101 to the feature point α and is calculated by Equation 4 shown below.

$$X_\alpha = R_w^T \frac{A^{-1}\tilde{m}_\alpha}{\|A^{-1}\tilde{m}_\alpha\|}$$ (Equation 4)

Similarly, Xβ represents a vector from the camera 101 to the feature point β, Xγ represents a vector from the camera 101 to the feature point γ, and Xδ represents a vector from the camera 101 to the feature point δ. All of these vectors are values that can be calculated on the basis of pixel position information (m), camera parameters (A), and camera rotation matrixes (R) of the respective feature points in the image.

ε1 to ε4 included in Equation 3 represent measurement errors. Four unknown numbers included in Equation 3, i.e., distances dα, dβ, dγ, and dδ from the camera 101 to the feature points of the object 300 are calculated to minimize ε representing the measurement errors. For example, the distances dα, dβ, dγ, and dδ from the camera 101 to the feature points of the object 300 are calculated to minimize the measurement errors ε by using the least square method.

According to the processing, it is possible to calculate distances (depths) from the camera 101 to the respective feature points of the object 300 and accurately map an object recognition result to the world coordinate system. However, in the method of calculating the distances using Equation 3, at least four points are necessary to perform mapping. If five or more feature points are obtained, equations are increased to calculate distances to minimize a sum of errors ε.

In the method explained with reference to FIG. 5, the entire object 300 is recorded in the photographed image 310. In other words, the object image 311 includes the entire object 300. When an object is not entirely included in a photographed image and only a part thereof is photographed, the information processing apparatus according to this embodiment can map an entire recognition target using a camera position and the dictionary data.

Figure 6:
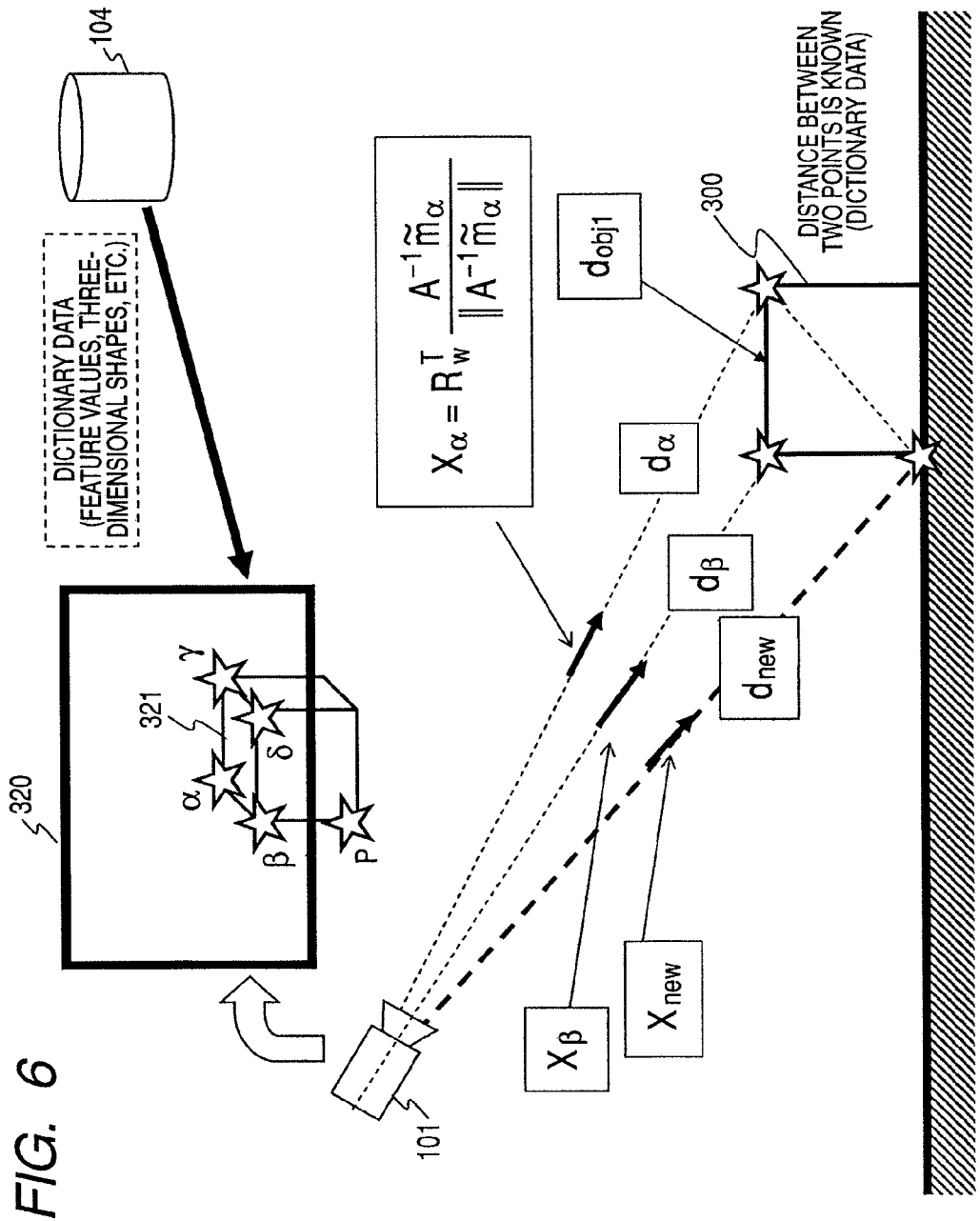
FIG. 6 is a diagram for explaining mapping processing for an entire object (recognition target) performed by using a camera position and the dictionary data when an object is partially imaged.

As shown in FIG. 6, even when the object 300 is not entirely included in a photographed image 321 and the object image 321 is imaged as a part of the object 300, the information processing apparatus according to this embodiment can map the entire object (recognition target) using a camera position and the dictionary data. In an example shown in FIG. 6, a feature point (P) is not included in the object image 321 and only feature points α, β, γ, and δ corresponding to four vertexes of an upper surface of the object image 321 are included in the object image 321.

In this case, as explained with reference to FIG. 5, it is possible to calculate respective distances dα, dβ, dγ, and dδ from the camera 101 to the feature points of the object 300 from Equation 3. Further, it is possible to calculate a distance from the camera to the feature point P, which is not photographed, on the basis of the three-dimensional shape data of the object 300 in the dictionary data and perform mapping of the object 300 in the world coordinate system.

The method described above is explained as the processing performed by using only a camera-photographed image of one frame. However, processing to which plural frame images are applied may be adopted. This is processing for calculating distances from the camera 101 to feature points using feature points extracted in the past as well. However, since positions in the three-dimensional space of the feature points are necessary, positions of feature points of the self-position detecting unit that uses the same feature points are used.

Second Embodiment

Figure 7:
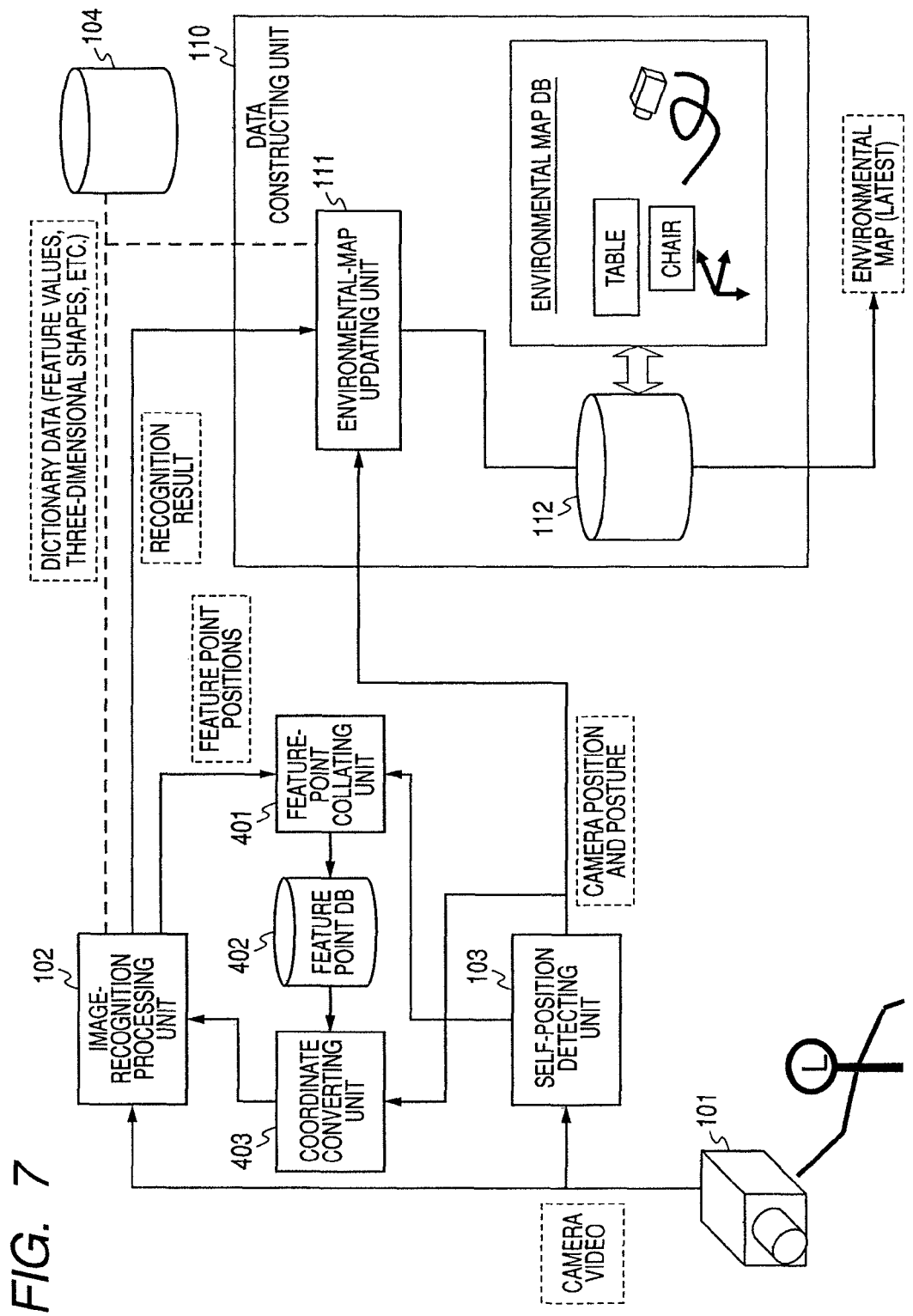
FIG. 7 is a diagram for explaining the structure and processing of an information processing apparatus according to a second embodiment of the present invention.

An information processing apparatus having an environmental map creation processing configuration to which plural frame images are applied is explained with reference to FIG. 7. According to this embodiment, as in the first embodiment, the information processing apparatus is an information processing apparatus that constructs an environmental map on the basis of image data photographed by the camera 101. As shown in FIG. 7, the information processing apparatus includes the camera 101 that photographs a peripheral environment, the image-recognition processing unit 102 that is inputted with a photographed image of the camera 101 and performs image recognition, the self-position detecting unit 103 that is inputted with the photographed image of the camera 101 and estimates a position and a posture of the camera 101, the data constructing unit 110 that is inputted with image recognition result data generated by the image-recognition processing unit 102 and information concerning the position and the posture of the camera 101 detected by the self-position detecting unit 103 and executes processing for creating an environmental map represented by a certain world coordinate system, and the dictionary-data storing unit 104 having stored therein dictionary data used for image recognition processing in the image-recognition processing unit 102 and environmental map creation processing in the data constructing unit 110. The data constructing unit 110 includes the environmental-map updating unit 111 and the environmental-map database 112. These components are the same as those in the first embodiment explained with reference to FIG. 1.

In the second embodiment, the information processing apparatus further includes a feature-point collating unit 401, a feature-point database 402, and a coordinate converting unit 403. The self-position detecting unit 103 performs processing for simultaneously calculating three-dimensional positions of feature points obtained from an image photographed by the camera 101 and a camera position.

Processing for performing creation (mapping) of a map around an agent (an environmental map) in conjunction with self-pose (position and posture) identification (localization) executed as confirmation of a pose (a position and a posture) such as a position and a direction of the agent is called SLAM (simultaneous localization and mapping). The second embodiment is based on this SLAM method.

The self-position detecting unit 103 calculates, for each of analysis frames, positions of feature points and a camera position using feature points in a video inputted from the camera 101 and outputs a camera position (Cw) and a camera rotation matrix (Rw) as estimated position and posture information of the camera 101 represented by the world coordinate system determined by the self-position detecting unit 103 to the data constructing unit 110. Further, the self-position detecting unit 103 outputs three-dimensional position information of feature points corresponding to analysis target frames to the feature-point collating unit 401. The analysis target frames may be all continuous frames of image frames photographed by the camera 101 or may be frames arranged at intervals set in advance.

The feature-point collating unit 401 compares feature points calculated by the image-recognition processing unit 102 and feature points inputted from the self-position detecting unit 103 in terms of a distance between photographed image spaces, for example, the number of pixels. However, when the self-position detecting unit 103 is calculating feature point position information in the world coordinate system, a feature point position in an image is calculated by using Equation 1.

The feature-point collating unit 401 verifies whether a distance between certain one feature point position detected from a certain frame image by the self-position detecting unit 103 and certain one feature point position detected from the same frame image by the image-recognition processing unit 102 is equal to or smaller than a threshold set in advance. When the distance is equal to or smaller than the threshold, the feature-point collating unit 401 considers that the feature points are identical and registers, in the feature point database 402, position information and identifiers in the camera coordinate system of feature points, which correspond to feature values of the feature points, detected by the self-position detecting unit 103.

The coordinate converting unit 403 converts the position information into the present camera image coordinate system for each of the feature points registered in the feature point database 402 and outputs the position information to the image-recognition processing unit 102. For the conversion processing for the position information, Equation 1 and the camera position Cw and the camera rotation matrix (Rw) as the estimated position and posture information represented by the world coordinate system, which are inputted from the self-position detecting unit 103, are used.

The image-recognition processing unit 102 can add feature point position information calculated from a preceding frame in the past, which is inputted from the coordinate converting unit 403, to feature point position information concerning a present frame set as a feature point analysis target and output the feature point position information to the data constructing unit 110. In this way, the image-recognition processing unit 102 can generate a recognition result including many kinds of feature point information extracted from plural frames and output the recognition result to the data constructing unit 110. The data constructing unit 110 can create an accurate environmental map based on the many kinds of feature point information.

Figure 8:
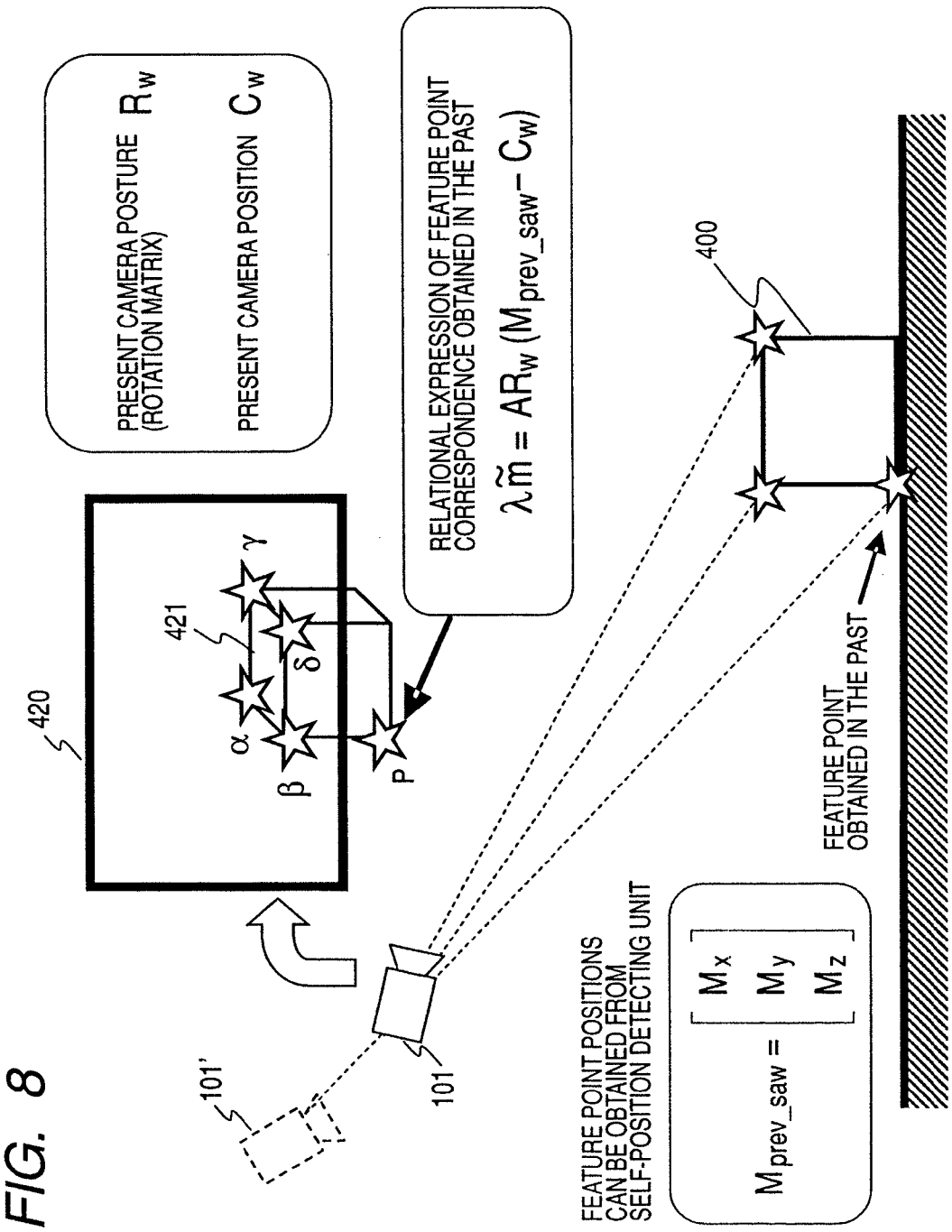
FIG. 8 is a diagram showing an example of use of feature point information acquired from a frame in the past.

FIG. 8 is a diagram showing an example of use of feature point information acquired from a frame in the past. A photographed image 420 indicates a photographed image that is a frame being analyzed in the image-recognition processing unit 102. Only a part of an object 400 is recorded in the photographed image 420. A feature point P is a feature point position detected in the frame in the past. The coordinate converting unit 403 calculates a position of the photographed image 420, which is a present frame, to which a position of the feature point P extracted from the frame in the past corresponds. The coordinate converting unit 403 provides the image-recognition processing unit 102 with the position. The image-recognition processing unit 102 can add the feature point P extracted in the frame in the past to four feature points α, β, γ, and δ included in the photographed image 420 and output information concerning these feature points to the data constructing unit 110. In this way, the image-recognition processing unit 102 can create a recognition result including information concerning a larger number of feature points extracted from plural frames and output the recognition result to the data constructing unit 110. The data constructing unit 110 can create an accurate environmental map based on the information concerning a larger number of feature points.

Third Embodiment

An example of processing for updating an environmental map using a recognition result of a camera position and a camera image is explained as a third embodiment of the present invention. The data constructing unit 110 shown in FIG. 1 performs processing for acquiring, from the dictionary-data storing unit 104, feature point information inputted from the image-recognition processing unit 102 and dictionary data including shape data of objects acquired as prior information and arranging the respective objects on an environmental map represented by a world coordinate system and creates an environmental map.

It is assumed that, after the environmental map is created, a part of the environment is changed. When a part of the environment is changed, there is a method of discarding the environmental map created in the past and creating a new environmental map on the basis of feature point information inputted anew. However, processing in this method takes a lot of time and labor. Therefore, in this embodiment, a changed portion is identified by using the environmental map created in the past and the identified changed portion is updated to create a new environmental map.

Figure 9:
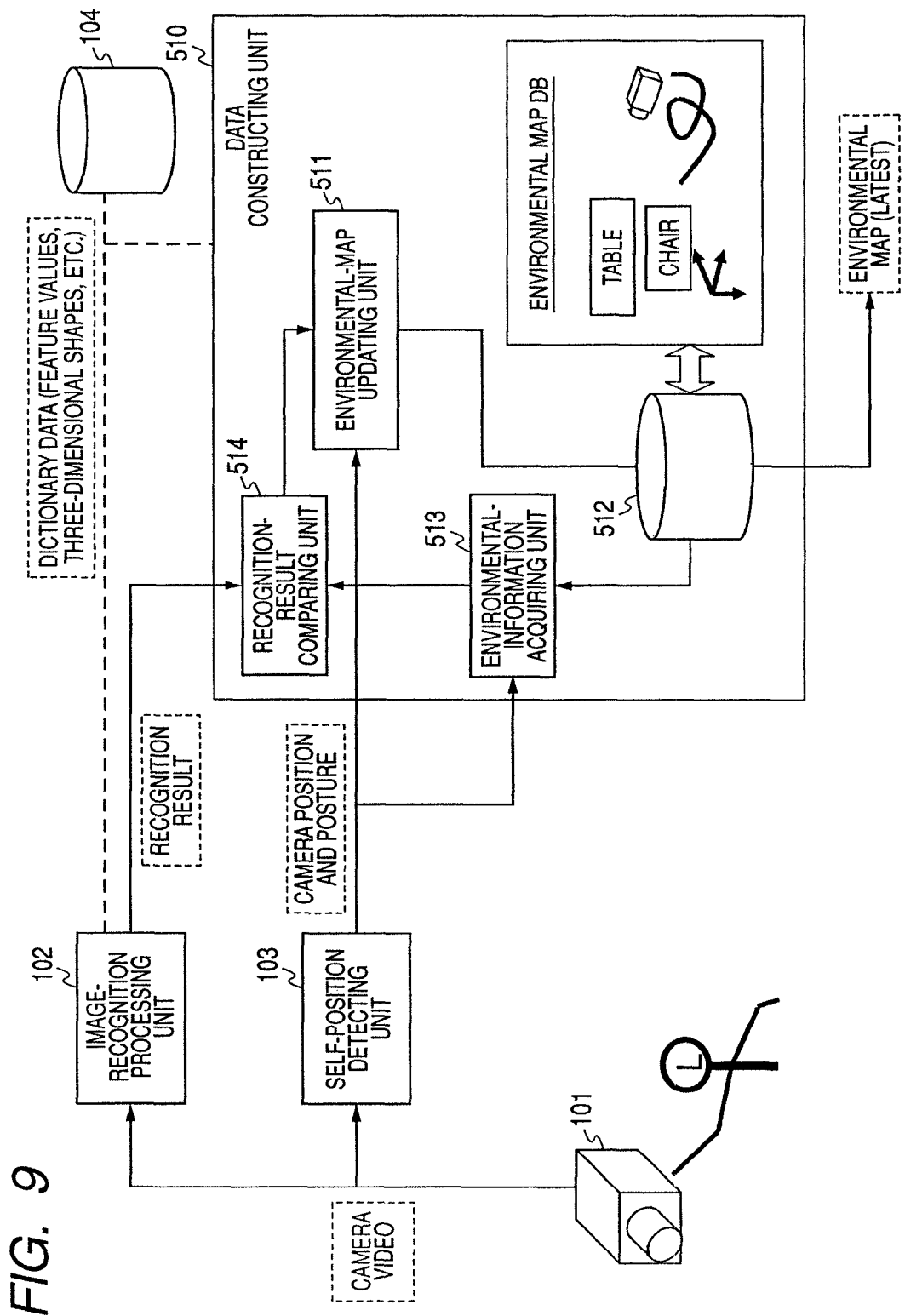
FIG. 9 is a diagram for explaining the structure and processing of an information processing apparatus according to a third embodiment of the present invention.

The structure and processing of an information processing apparatus according to this embodiment is explained with reference to FIG. 9. According to this embodiment, as in the first embodiment, the information processing apparatus creates an environmental map on the basis of image data photographed by a camera. As shown in FIG. 9, the information processing apparatus includes the camera 101 that photographs a peripheral environment, the image-recognition processing unit 102 that is inputted with a photographed image of the camera 101 and performs image recognition, the self-position detecting unit 103 that is inputted with the photographed image of the camera 101 and estimates a position and a posture of the camera 101, a data constructing unit 510 that is inputted with image recognition result data generated by the image-recognition processing unit 102 and information concerning the position and the posture of the camera 101 detected by the self-position detecting unit 103 and executes processing for creating an environmental map represented by a certain world coordinate system, and the dictionary-data storing unit 104 having stored therein dictionary data used for image recognition processing in the image-recognition processing unit 102 and environmental map creation processing in the data constructing unit 510. The data constructing unit 510 includes an environmental-map updating unit 511 and an environmental map database 512. These components are the same as those in the first embodiment explained with reference to FIG. 1.

The data constructing unit 510 further includes an environmental-information acquiring unit 513 and a recognition-result comparing unit 514. The environmental-information acquiring unit 513 detects, using self-position information of the camera 101 obtained by the self-position detecting unit 103, environmental information including various objects estimated as being taken by the camera 101 by using an environmental map (e.g., an environmental map created on the basis of an image in the past) stored in the environmental map database 512.

The recognition-result comparing unit 514 compares environmental information (feature point information, etc.) judged by the environmental-information acquiring unit 513 as being acquired from a photographed image corresponding to a present camera position estimated on the basis of a created environmental map and a recognition result (feature point information) obtained from an actual photographed image by the image-recognition processing unit 102.

The environmental-map updating unit 511 is inputted with comparison information of the recognition-result comparing unit 514, corrects the environmental map created in the past and stored in the environmental map database 512 using the comparison information, and executes map update processing.

Respective modules used in this embodiment are explained in detail.

The environmental-information acquiring unit 513 is inputted with camera position and posture information acquired by the self-position detecting unit 103, judges which part of the environmental map stored in the environmental map database 512 is acquired as a photographed image, and judges positions of feature points and the like included in the estimated photographed image.

In the environmental map stored in the environmental map database 512, the respective objects are registered by the world coordinate system. Therefore, the environmental-information acquiring unit 513 converts respective feature point positions into a camera coordinate system using Equation 1 and determines in which positions of the photographed image feature points appear. In Equation 1, input information from the self-position detecting unit 103 is applied as the camera position (Cw) and the camera rotation matrix (Rw) that are estimated position and posture information of the camera 101. The environmental-information acquiring unit 513 judges whether "m" in the left side of Equation 1 is within an image photographed anew and set as an analysis target in the image-recognition processing unit 102.

The recognition-result comparing unit 514 compares environmental information (feature point information, etc.) judged by the environmental-information acquiring unit 513 as being acquired from a photographed image corresponding to a present camera position estimated on the basis of a created environmental map and a recognition result (feature point information) obtained from an actual photographed image by the image-recognition processing unit 102. As comparison information, there are various parameters. However, in this embodiment, the following two comparison examples are explained:

(1) comparison of feature points; and
(2) comparison of centers of gravity and postures of recognition targets represented by a certain probability distribution model.

(1) Comparison of Feature Points

Figure 10:
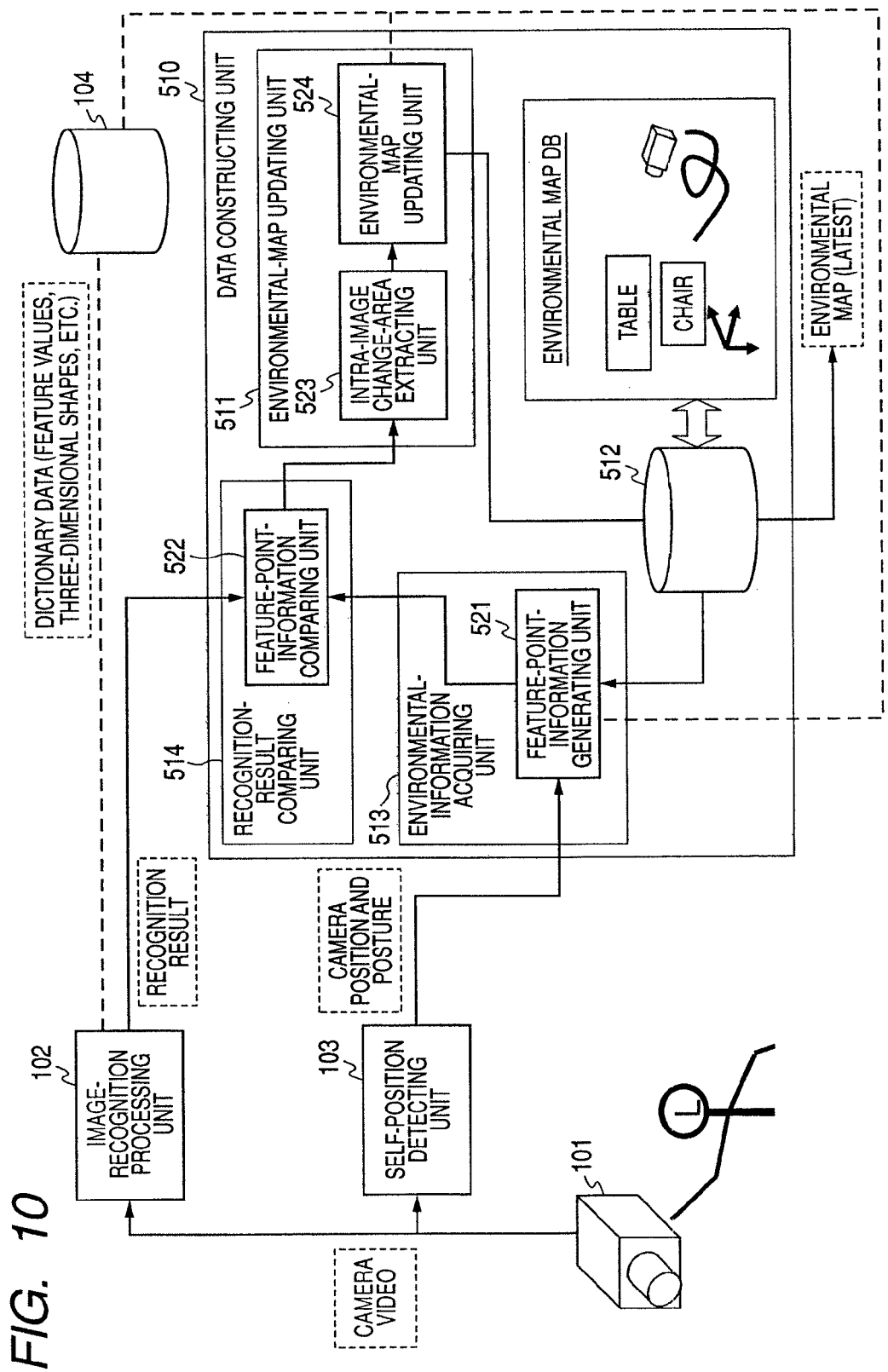
FIG. 10 is a diagram for explaining the structure and the processing of the information processing apparatus according to the embodiment.

First, an example of feature point comparison in the recognition-result comparing unit 514 is explained with reference to FIG. 10. In this embodiment, as shown in FIG. 10, a feature-point-information generating unit 521 is set in the environmental-information acquiring unit 513. A feature-point-information comparing unit 522 is provided in the recognition-result comparing unit 514. An intra-image change-area extracting unit 523 and an environmental-map updating unit 524 are provided in the environmental-map updating unit 511.

The feature-point-information generating unit 521 of the environmental-information acquiring unit 513 is inputted with camera position and posture information acquired by the self-position detecting unit 103, judges which part of the environmental map stored in the environmental map database 512 is acquired as a photographed image, and acquires feature point information of positions of feature points and the like included in the estimated photographed image. The feature point information indicates information including positions and feature values of feature points. The feature-point-information generating unit 521 generates feature information of all feature pints estimated as being taken by the camera 101 on the basis of the environmental map, the camera position and posture, and the dictionary data.

The feature-point comparing unit 522 of the recognition-result comparing unit 514 is inputted with feature point information obtained from environmental maps accumulated in the past by the feature-point-information generating unit 521 and is further inputted with a recognition result (feature point information) obtained from an actual photographed image by the image-recognition processing unit 102 and compares the feature point information and the recognition result. The feature point-comparing unit 522 calculates positions of matched feature points and a distance between the feature points. Information concerning the positions and the distance is outputted to the intra-image change-area extracting unit 523 of the environmental-map updating unit 511.

The intra-image change-area extracting unit 523 extracts, as an update area of the environmental map, an area other than an area where the distance between the matched feature points is smaller than a threshold set in advance. Information concerning the extracted area is outputted to the environmental-map updating unit 524.

The environmental-map updating unit 524 acquires the environmental maps accumulated in the past, executes map update for only the extracted area selected as the update area by the intra-image change-area extracting unit 523 using the feature point information inputted from the image-recognition processing unit 102 anew, and does not change the information of the created environmental map and uses the information for the other area. According to this processing, it is possible to perform efficient environmental map update.

Figure 11:
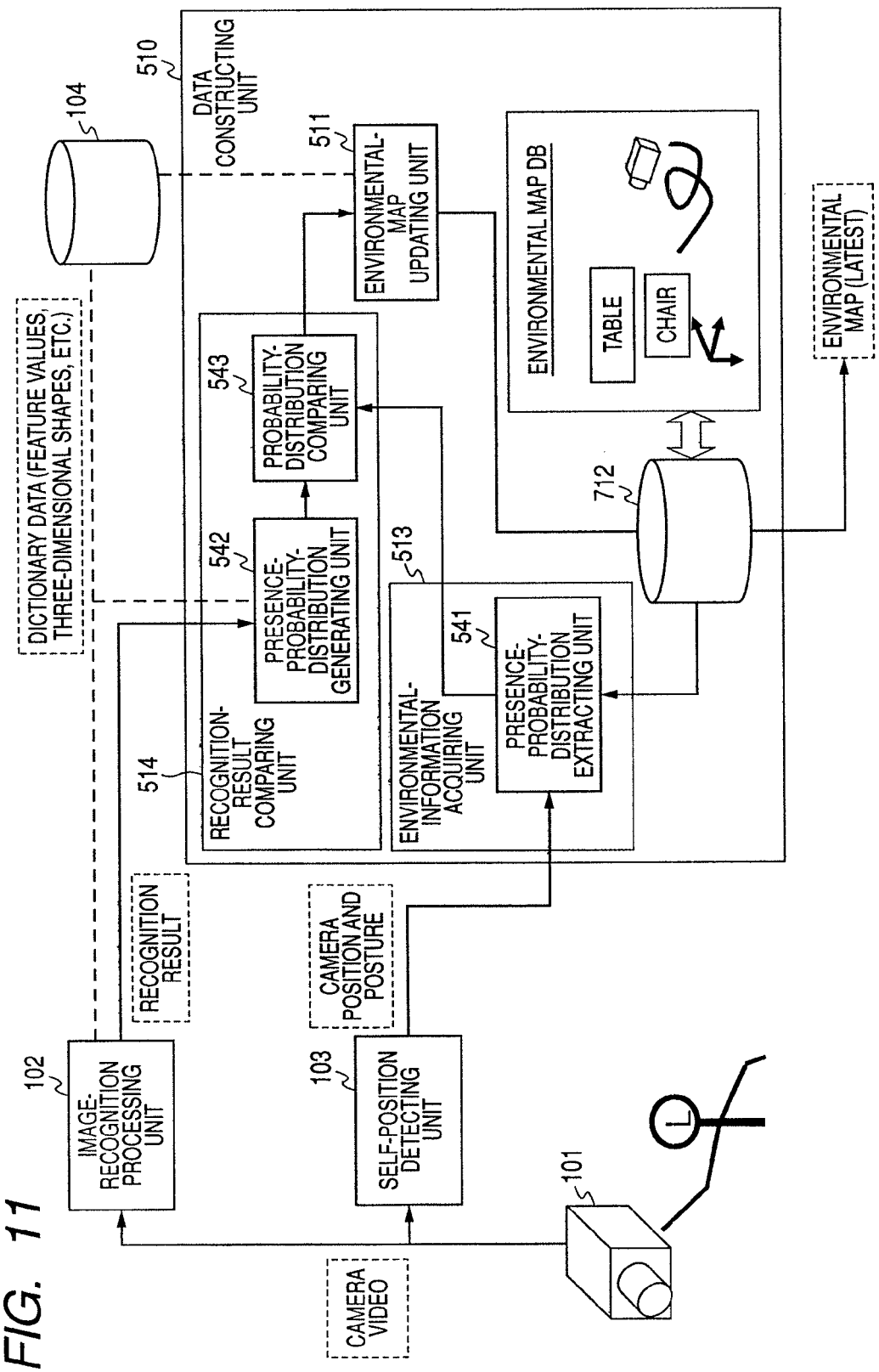
FIG. 11 is a diagram for explaining the structure and the processing of the information processing apparatus according to the embodiment.

(2) Comparison of Centers of Gravity and Postures of Recognition Targets Represented by a Certain Probability Distribution Model An example of comparison of centers of gravity and postures of recognition targets represented by a certain probability distribution model in the recognition-result comparing unit 514 is explained with reference to FIG. 11. In this embodiment, as shown in FIG. 11, a presence-probability-distribution extracting unit 541 is set in the environmental-information acquiring unit 513 and a presence-probability-distribution generating unit 542 and a probability-distribution comparing unit 543 are provided in the recognition-result comparing unit 514.

The presence-probability-distribution generating unit 542 of the recognition-result comparing unit 514 is inputted with an image recognition result from the image-recognition processing unit 102 and generates a presence probability distribution of a recognized object in the image recognition result. It is assumed that the presence probability distribution complies with a multi-dimensional regular distribution represented by an average (three-dimensional position and quarternion) covariance matrix. In image recognition, since a presence probability distribution is not calculated, a user gives the presence probability distribution as a constant.

The presence-probability-distribution extracting unit 541 of the environmental-information acquiring unit 513 extracts a presence probability distribution of a gravity and a posture of the recognized object included in an image photographed by the camera 101 (an average covariance matrix) using the environmental map acquired from the environmental map database 512.

The presence-probability-distribution comparing unit 543 of the recognition-result comparing unit 514 uses, for example, the following equation (Equation 5) for comparison of the presence probability distribution of the recognized object generated by the presence-probability-distribution extracting unit 541 of the environmental-information acquiring unit 513 on the basis of the environmental map and the presence probability distribution of the object generated by the presence-probability-distribution generating unit 542 of the recognition-result comparing unit 514 on the basis of the recognition result from the image-recognition processing unit 102:

$$s=(z-\hat{z})(\Sigma_z+\Sigma_{\hat{z}})^{-1}(z-\hat{z}) \quad \text{(Equation 5)}$$

In Equation 5, "s" represents a Mahalanobis distance and is a value corresponding to a difference between the presence probability distribution of the recognized object generated on the basis of the environmental map and the presence probability distribution of the object generated on the basis of the recognition result from the image-recognition processing unit 102. The presence-probability-distribution comparing unit 543 of the recognition-result comparing unit 514 outputs a value of "s" of Equation 5 to the environmental-map updating unit 511.

When the value of "s" of Equation 5 inputted from the presence-probability-distribution comparing unit 543 of the recognition-result comparing unit 514 is smaller than a threshold set in advance, the environmental-map updating unit 511 judges that the object recorded in the environmental map database 112 and the recognized object obtained as the image recognition result based on the new photographed image are identical and does not perform correction of the environmental map database. However, when "s" is larger than the threshold, the environmental-map updating unit 511 judges that a different object appears and updates the environmental map registered in the environmental map database 512.

Fourth Embodiment

In the embodiments described above, the processing is performed on condition that the respective objects registered in the environmental map are stationary objects that do not move. When moving objects are included in a photographed image and these moving objects are registered in the environmental map, processing for distinguishing the moving objects (moving bodies) and the stationary objects (stationary objects) is necessary. The fourth embodiment is an example of processing for executing creation and update of the environmental map by performing the processing for distinguishing the moving objects and the stationary objects.

Figure 12:
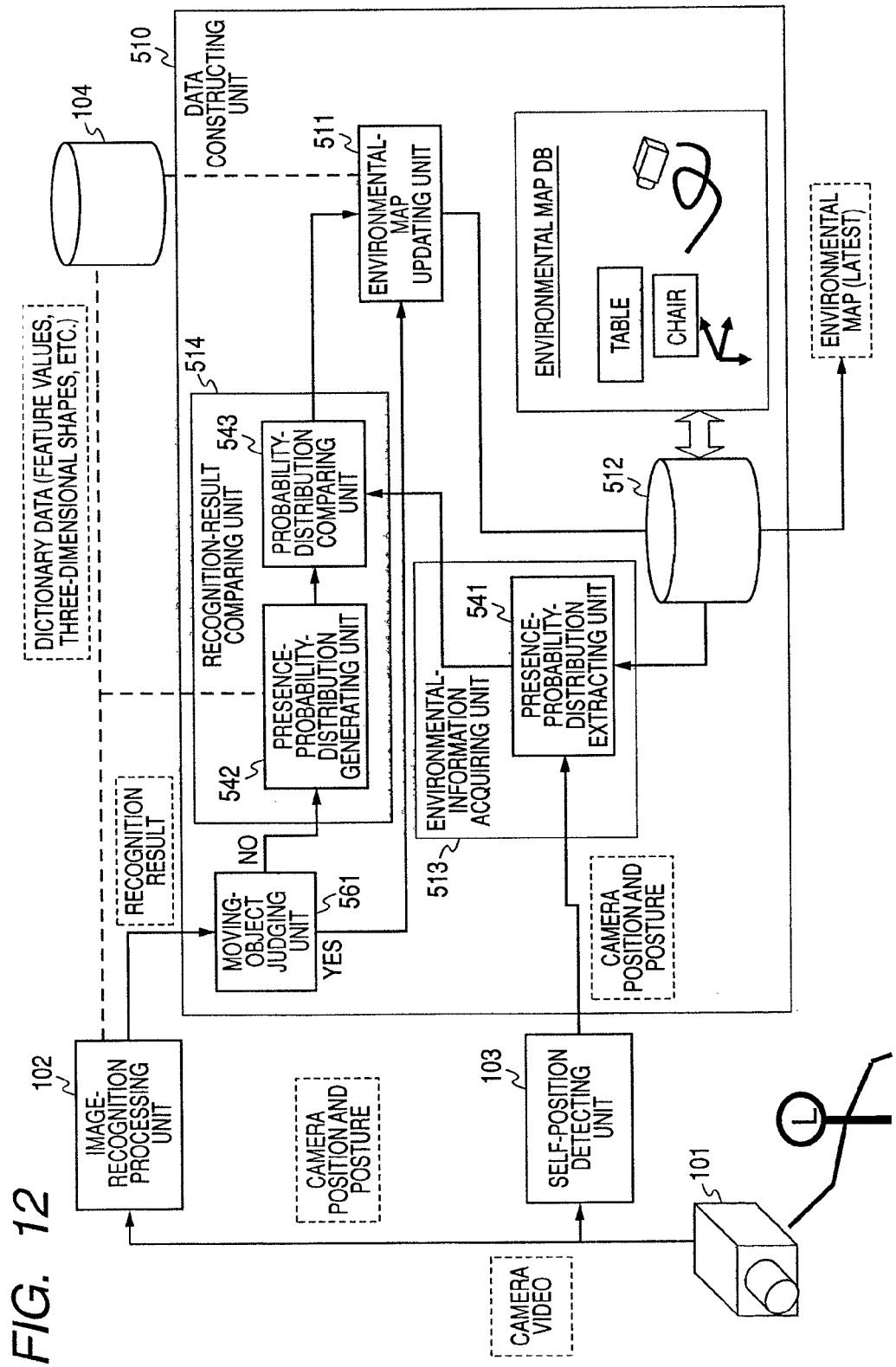
FIG. 12 is a diagram for explaining the structure and processing of an information processing apparatus according to a fourth embodiment of the present invention.

This embodiment is explained with reference to FIG. 12. An example shown in FIG. 12 is based on the information processing apparatus that performs the comparison of centers of gravity and postures of recognition targets represented by a certain probability distribution model explained with reference to FIG. 11. A moving-object judging unit 561 is added to the information processing apparatus.

The information processing apparatus according to this embodiment is different from the information processing apparatus explained with reference to FIG. 10 in that the moving-object judging unit 561 is inputted with a recognition result from the image-recognition processing unit 102 and judges whether an object as a result of image recognition is a moving object. The moving-object judging unit 561 judges, on the basis of stored data in the dictionary-data storing unit 104, whether an object as a result of image recognition is a moving object or a stationary object. In this processing example, it is assumed that, in dictionary data as stored data in the dictionary-data storing unit 104, object attribute data indicating whether respective objects are moving objects or stationary objects is registered.

When an object recognized as a moving object is included in objects included in a recognition result from the image-recognition processing unit 102, information concerning this object is directly outputted to the environmental-map updating unit 511. The environmental-map updating unit 511 registers the moving object on the environmental map on the basis of the object information.

When an object recognized as a stationary object is included in the objects included in the recognition result from the image-recognition processing unit 102, information concerning this object is outputted to the recognition-result comparing unit 514. Thereafter, processing same as the processing explained with reference to FIG. 11 is executed. The environmental-map updating unit 511 automatically deletes the information concerning the moving object frame by frame.

Fifth Embodiment

An example of an information processing apparatus that limits recognition targets and a search range of the objects in an image-recognition processing unit using an environmental map is explained as a fifth embodiment of the present invention.

The environmental map can be created and updated by, for example, the processing according to any one of the first to fourth embodiments described above. The information processing apparatus according to the fifth embodiment can limit types and a search range of objects recognized by the image-recognition processing unit using the environmental map created in this way.

An ontology map created by collecting ontology data (semantic information) among objects is prepared in advance and stored in a storing unit. The ontology data (the semantic information) systematically classifies objects present in an environment and describes a relation among the objects.

For example, information such as "a chair and a table are highly likely to be in contact the floor", "a face is highly likely to be present in front of a monitor of a television turned on", and "it is less likely that a television is present in a bath room" is ontology data. An ontology map is formed by collecting the ontology data for each of objects.

In the fifth embodiment, the information processing apparatus limits types and a search range of objects recognized by the image-recognition processing unit using the ontology map. The information processing apparatus according to the fifth embodiment is an information processing apparatus that executes processing for specifying an object search range on the basis of the environmental map. The information processing apparatus includes the storing unit having stored therein ontology data (semantic information) indicating the likelihood of presence of a specific object in an area adjacent to an object and the image-recognition processing unit that determines a search range of the specific object on the basis of the ontology data (the semantic information).

Figure 13:
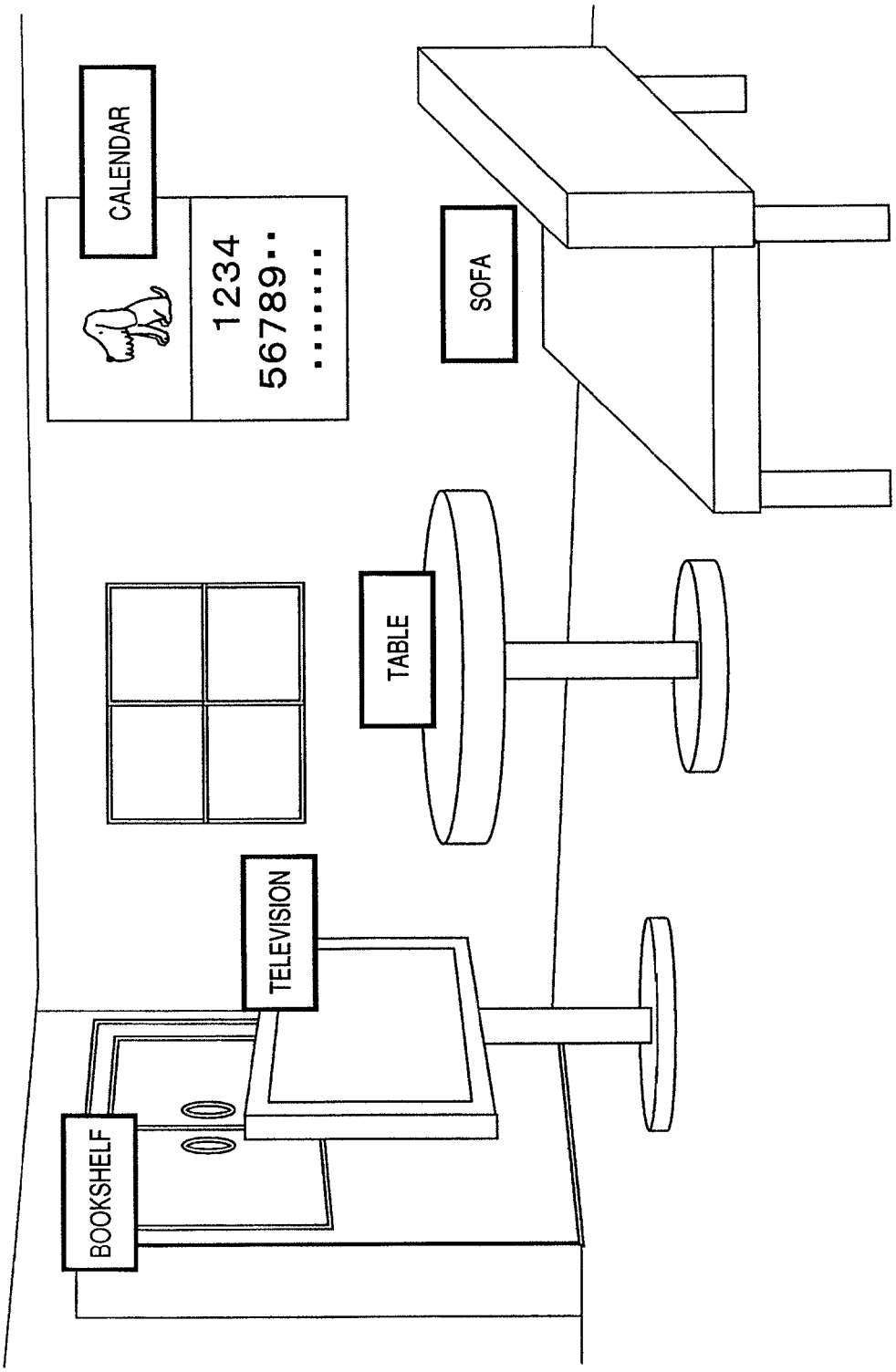
FIG. 13 is a diagram for explaining an example of image recognition processing for detecting a position of a face.

For example, a position of a face is detected in an environment shown in FIG. 13. It is assumed that the environmental map is already created. First, a floor surface is detected and a ceiling direction is estimated. As objects that are extremely highly likely to be in contact with the ground (a vending machine, a table, a car, etc.), in FIG. 13, there are a table and a sofa.

Since positions and postures of the table and the sofa are known from the environmental map, a plane equation of the floor is calculated from the positions and the postures. Consequently, the floor surface and the ceiling direction are identified.

Places where a position of a face is likely to be present are searched on the basis of the ontology map. In the environment shown in FIG. 13, it is possible to divide the places as follows:

"places where the face is extremely highly likely to be present": on the sofa and in front of the television; and "places where the face is less likely to be present": right above the television, in the bookshelf, and the wall behind the calendar.

Figure 14:
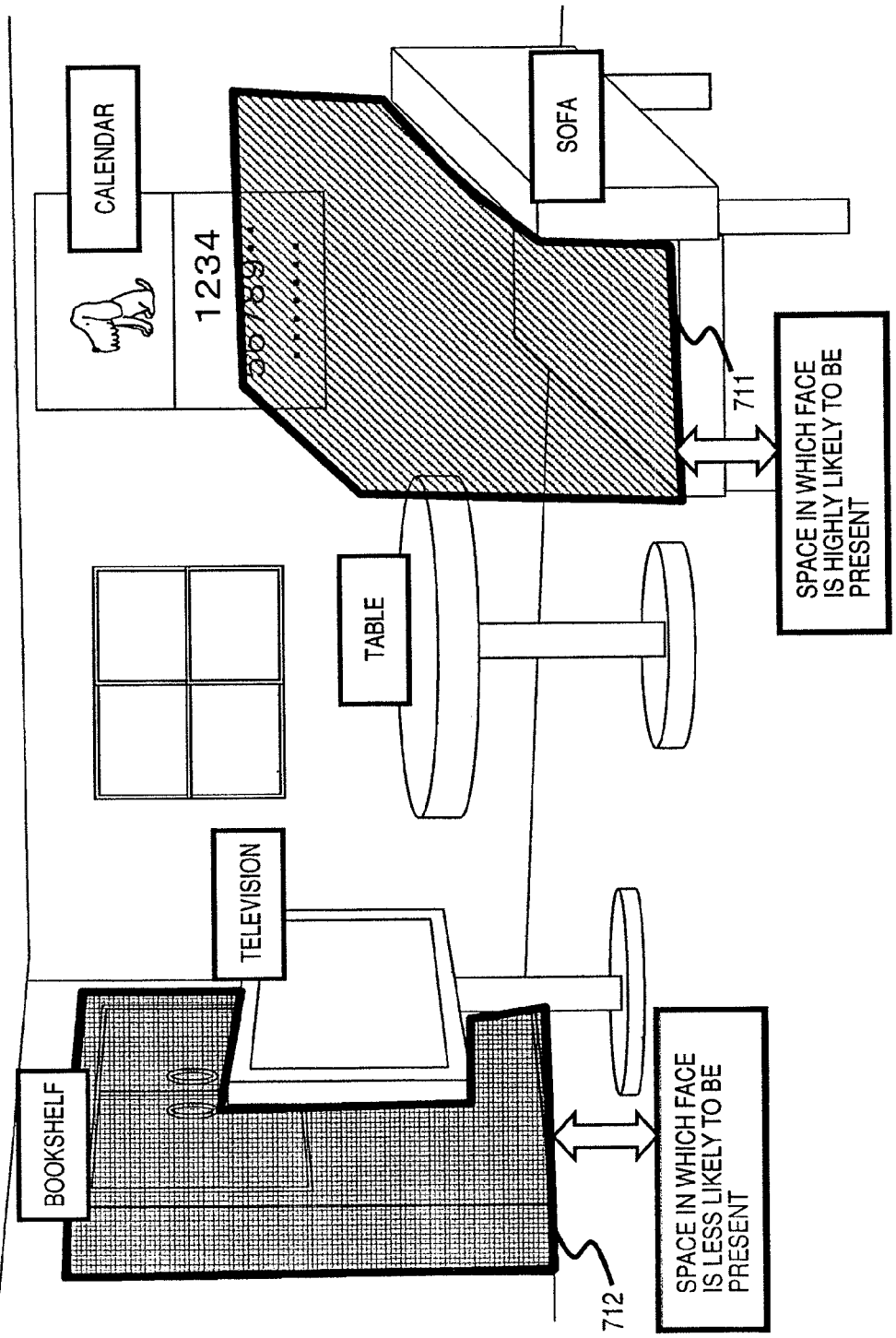
FIG. 14 is a diagram for explaining the example of the image recognition processing for detecting a position of a face.

This division is associated with the three-dimensional space to designate a range. The range is reflected on an image by using Equation 1. For example, division information 711 and 712 shown in FIG. 14 can be set. This result of the reflection is passed to an image recognition module. According to this processing, it is possible to improve an image recognition rate and realize an increase in speed of image recognition.

The present invention has been described in detail with reference to the specific embodiments. However, it is evident that those skilled in the art can perform correction and substitution of the embodiments without departing from the spirit of the present invention. In other words, the present invention has been disclosed in a form of illustration and should not be limitedly interpreted. To judge the gist of the present invention, the claims should be taken into account.

The series of processing explained in the specification can be executed by hardware, software, or a combination of the hardware and the software. When the processing by the software is executed, it is possible to install a program having a processing sequence recorded therein in a memory in a computer built in dedicated hardware and cause the computer to execute the program or install the program in a general-purpose computer capable of executing various kinds of processing and cause the computer to execute the program. For example, the program can be recorded in a recording medium in advance. Besides installing the program from the recording medium to the computer, it is possible to receive the program through a network such as a LAN (Local Area Network) or the Internet and install the program in a recording medium such as a hard disk built in the computer.

The various kinds of processing described in this specification are not only executed in time series according to the description. The processing may be executed in parallel or individually according to a processing ability of an apparatus that executes the processing or according to necessity. The system in this specification is a logical set of plural apparatuses and is not limited to a system in which apparatuses having respective structures are provided in an identical housing.

As explained above, according to an embodiment of the present invention, an information processing apparatus executes self-position detection processing for detecting a position and a posture of a camera on the basis of an image acquired by the camera, image recognition processing for detecting an object from the image acquired by the camera, and processing for creating or updating an environmental map by applying position and posture information of the camera, object information, and a dictionary data in which object information including at least three three-dimensional shape data corresponding to the object is registered. Therefore, it is possible to efficiently create an environmental map, which reflects three-dimensional data of various objects, on the basis of images acquired by one camera.

It should be understood by those skilled in the art that various modifications, combinations, sub-combinations, and alterations may occur depending on design requirements and other factors insofar as they are within the scope of the appended claims or the equivalents thereof.

What is claimed is:

1. An information processing apparatus that executes processing for creating an environmental map, the information processing apparatus comprising:

a dictionary-data acquiring unit that acquires dictionary data in which object information including at least three-dimensional shape data corresponding to objects is registered;

an image-recognition processing unit that detects an object from an image acquired by a camera with reference to the dictionary data; and a data constructing unit that
      receives information concerning a position and a posture of the camera and information concerning the object;
      executes processing for creating or updating the environmental map;
      applies the three-dimensional shape data registered in the dictionary data to the environmental map; and
      executes object arrangement on the environmental map.

2. The information processing apparatus of claim 1, further comprising an image acquiring unit that acquires the image which is generated through a photographing of the camera.

3. The information processing apparatus of claim 1, further comprising a camera-position detecting unit that detects the position and the posture of the camera and generates the information concerning the position and the posture of the camera.

4. The information processing apparatus of claim 3, wherein
   the image-recognition processing unit identifies a position of a feature point of the object included in the image and outputs the position of the feature point to the data constructing unit, and
   the data constructing unit calculates a position and a posture of the object in a world coordinate system based on information concerning the feature point inputted from the image-recognition processing unit and information concerning the position and the posture of the camera inputted from the camera-position detecting unit and registers the position and the posture of the object in the world coordinate system in the environmental map.

5. The information processing apparatus of claim 3, wherein the camera-position detecting unit executes processing for calculating a camera position (Cw) and a camera rotation matrix (Rw) as estimated position and posture information of the camera, which are represented by a world coordinate system by using a feature point in the image, and outputting the camera position (Cw) and the camera rotation matrix (Rw) to the data constructing unit.

6. The information processing apparatus of claim 3, wherein the camera-position detecting unit executes SLAM (simultaneous localization and mapping) for simultaneously detecting a position of a feature point in the image and a position and a posture of the camera.

7. The information processing apparatus of claim 1, further comprising:
   a coordinate converting unit that converts a position of a feature point in an object in an image frame before an object detection target frame in the image-recognition processing unit into a position on a coordinate corresponding to an image of the object detection target frame in the image-recognition processing unit, wherein
   the image-recognition processing unit executes processing for outputting feature point information provided by the coordinate converting unit to the data constructing unit.

8. The information processing apparatus of claim 7, further comprising:
   a feature-point collating unit that records, when a feature point detected by the image-recognition processing unit and a feature point detected by the camera-position detecting unit are at a distance within a predetermined threshold, the feature points in a feature point database, wherein the coordinate converting unit performs processing for converting positions of the feature points recorded in the feature point database into positions on the coordinate corresponding to the image of the object detection target frame in the image-recognition processing unit and making the positions of the feature points usable in the image-recognition processing unit.

9. The information processing apparatus of claim 1, wherein the data constructing unit comprises:

an environmental map database that stores a generated environmental map;

an environmental-information acquiring unit that acquires the environmental map from the environmental map database;

a recognition-result comparing unit that compares the environmental map acquired by the environmental-information acquiring unit and object detection information inputted from the image-recognition processing unit and outputs a result of the comparison to an environmental-map updating unit; and the environmental-map updating unit that executes, on the basis of the result of the comparison inputted from the recognition-result comparing unit, processing for updating the environmental map stored in the environmental map database.

10. The information processing apparatus of claim 9, wherein the environmental-information acquiring unit includes a feature-point-information generating unit that acquires the environmental map from the environmental map database and generates feature point information including a position of a feature point included in the acquired environmental map, the recognition-result comparing unit includes a feature-point-information comparing unit that compares feature point information corresponding to an object inputted from the image-recognition processing unit and the feature point information generated by the feature-point-information generating unit and outputs comparison information to an intra-image-change-area extracting unit in the environmental-map updating unit, and the environmental-map updating unit includes:

the intra-image-change-area extracting unit that is inputted with the comparison information from the feature-point-information comparing unit and extracts, as an update area of the environmental map, an area other than an area where a distance between matched feature points is smaller than a threshold set in advance; and an environmental-map updating unit that executes update processing on the environmental map stored in the environmental map database using the feature point information inputted from the image-recognition processing unit with only the update area extracted by the intra-image-change-area extracting unit set as an update target.

11. The information processing apparatus of claim 9, wherein the environmental-information acquiring unit includes a presence-probability-distribution extracting unit that acquires the environmental map from the environmental map database and extracts a presence probability distribution of centers of gravity and postures of objects included in the acquired environmental map, the recognition-result comparing unit includes:

a presence-probability-distribution generating unit that is inputted with an object recognition result from the image-recognition processing unit and generates a presence probability distribution of the recognized object; and a probability-distribution comparing unit that compares a presence probability distribution of the recognized object generated by the presence-probability-distribution generating unit on the basis of the environmental map and a presence probability distribution of the object generated by the presence-probability-distribution generating unit on the basis of the recognition result of the image-recognition processing unit and outputs comparison information to the environmental-map updating unit, and the environmental-map updating unit determines an update area of the environmental map on the basis of the comparison information inputted from the presence-probability-distribution comparing unit and executes update processing on the environmental map stored in the environmental map database using feature point information inputted from the image-recognition processing unit with only the update area set as an update target.

12. The information processing apparatus of claim 11, wherein the probability-distribution comparing unit calculates a Mahalanobis distance "s" indicating a difference between the presence probability distribution of the recognized object generated by the presence-probability-distribution extracting unit on the basis of the environmental map and the presence probability distribution of the object generated by the presence-probability-distribution generating unit on the basis of the recognition result of the image-recognition processing unit and outputs the Mahalanobis distance "s" to the environmental-map updating unit, and the environmental-map updating unit executes, when the Mahalanobis distance "s" is larger than a threshold set in advance, processing for updating the environmental map registered in the environmental map database.

13. The information processing apparatus of claim 1, further comprising a moving-object judging unit that receives a recognition result from the image-recognition processing unit;

determines whether an object indicated in the recognition result is a moving object based on the dictionary data.

14. An information processing method for executing processing for creating an environmental map, the information processing method comprising:

an image-recognition processing step in which an image-recognition processing unit detects an object from an image acquired by a camera with reference to dictionary data in which object information including at least three-dimensional shape data corresponding to objects is registered; and a data constructing step in which a data constructing unit receives information concerning a position and a posture of the camera and information concerning the object detected by the image-recognition processing unit;

executes processing for creating or updating the environmental map;

applies the three-dimensional shape data registered in the dictionary data to the environmental map; and executes object arrangement on the environmental map.

15. The information processing method of claim 14, further comprising an image acquiring step in which the image of the object is acquired by the camera.

16. The information processing method of claim 14, further comprising a self-position detecting step in which a self-position detecting unit detects a position and a posture of the camera on the basis of the image acquired by the camera.

17. The information processing method of claim 16, wherein
the image-recognition processing step further comprises identifying a position of a feature point of the object included in the image acquired by the camera and executing processing for outputting the position of the feature point to the data constructing unit, and
the data constructing step further comprises executing processing for calculating a position and a posture in a world coordinate system of the object on the basis of information concerning the feature point inputted from the image-recognition processing unit and information concerning the position and the posture of the camera inputted from the self-position detecting unit and registering the position and the posture in the world coordinate system of the object in the environmental map.

18. The information processing method of claim 16, wherein the self-position detecting step further comprises executing processing for calculating a camera position (Cw) and a camera rotation matrix (Rw) as estimated position and posture information of the camera, which are represented by a world coordinate system by using a feature point in the image inputted from the camera, and outputting the camera position (Cw) and the camera rotation matrix (Rw) to the data constructing unit.

19. The information processing method of claim 18, further comprising:
a feature-point collating step in which a feature-point collating unit records, when a feature point detected by the image-recognition processing unit and a feature point detected by the self-position detecting unit are at a distance within a threshold set in advance, the feature points in a feature point database, wherein
the coordinate converting step further comprises performing processing for converting positions of the feature points recorded in the feature point database into positions on the coordinate corresponding to the image of the object detection target frame in the image-recognition processing unit and making the positions of the feature points usable in the image-recognition processing unit.

20. The information processing method of claim 16, wherein the self-position detecting step further comprises executing SLAM (simultaneous localization and mapping) for simultaneously detecting a position of a feature point in the image inputted from the camera and a position and a posture of the camera.

21. The information processing method of claim 14, further comprising:
a coordinate converting step in which a coordinate converting unit converts a position of a feature point in an object in an image frame before an object detection target frame in the image-recognition processing unit into a position on a coordinate corresponding to an image of the object detection target frame in the image-recognition processing unit, wherein
the image-recognition processing step further comprises executing processing for outputting feature point information provided by the coordinate converting unit to the data constructing unit.

22. The information processing method of claim 14, wherein the data constructing step comprises:

an environmental-information acquiring step in which an environmental-information acquiring unit acquires the generated environmental map from an environmental map database;
a recognition-result comparing step in which a recognition-result comparing unit compares the environmental map acquired from the environmental map database and object detection information inputted from the image-recognition processing unit and outputs a result of the comparison to an environmental-map updating unit; and
an environmental-map updating step in which the environmental-map updating unit executes, on the basis of the result of the comparison inputted from the recognition-result comparing unit, processing for updating the environmental map stored in the environmental map database.

23. The information processing method of claim 22, wherein
the environmental-information acquiring step includes a feature-point-information generating step in which a feature-point-information generating unit acquires the environmental map from the environmental map database and generates feature point information including a position of a feature point included in the acquired environmental map, and
the recognition-result comparing step includes a feature-point-information comparing step in which the feature-point-information comparing unit compares feature point information corresponding to an object inputted from the image-recognition processing unit and the feature point information generated by the feature-point-information generating unit and outputs comparison information to an intra-image-change-area extracting unit in the environmental-map updating unit,
the environmental-map updating step includes:
an intra-image change-area extracting step in which the intra-image-change-area extracting unit is inputted with the comparison information from the feature-point-information comparing unit and extracts, as an update area of the environmental map, an area other than an area where a distance between matched feature points is smaller than a threshold set in advance; and
an environmental-map updating step in which an environmental-map updating unit executes update processing on the environmental map stored in the environmental map database using the feature point information inputted from the image-recognition processing unit with only the update area extracted by the intra-image-change-area extracting unit set as an update target.

24. The information processing method of claim 23, wherein
the probability-distribution comparing step is a step of calculating a Mahalanobis distance "s" indicating a difference between the presence probability distribution of the recognized object generated by the presence-probability-distribution extracting unit on the basis of the environmental map and the presence probability distribution of the object generated by the presence-probability-distribution generating unit on the basis of the recognition result of the image-recognition processing unit and outputting the Mahalanobis distance "s" to the environmental-map updating unit, and
the environmental-map updating step is a step of executing, when the Mahalanobis distance "s" is larger than a threshold set in advance, processing for updating the environmental map registered in the environmental map database.

25. A nontransitory computer-readable storage medium encoded with a computer program, which when executed by an information processing apparatus, caused the information processing apparatus to perform processing for creating an environmental map, the processing comprising:

an image-recognition processing step of causing an image-recognition processing unit to detect an object from an image acquired by a camera; and a data constructing step of inputting information concerning the position and the posture of the camera detected by the self-position detecting unit and information concerning the object detected by the image-recognition processing unit to a data constructing unit and causing the data constructing unit to execute processing for creating or updating the environmental map, wherein the image-recognition processing step is a step of detecting an object from the image acquired by the camera with reference to dictionary data in which object information including at least three-dimensional shape data corresponding to objects is registered, and the data constructing step is a step of applying the three-dimensional shape data registered in the dictionary data to the environmental map and executing object arrangement on the environmental map.

26. The nontransitory computer-readable storage medium of claim 25, wherein the processing further comprises an image photographing step of causing the camera to photograph the image.

27. The nontransitory computer-readable storage medium of claim 25, wherein the processing further comprises a self-position detecting step of causing a self-position detecting unit to detect a position and a posture of the camera on the basis of the image acquired by the camera.

* * * * *